United States Patent
Yamada et al.

(10) Patent No.: US 10,359,865 B2
(45) Date of Patent: Jul. 23, 2019

(54) STYLUS, STYLUS SIGNAL PROCESSING METHOD, AND STYLUS SIGNAL PROCESSING DEVICE

(71) Applicant: Wacom Co., Ltd., Saitama (JP)

(72) Inventors: Masahiko Yamada, Saitama (JP); David Charles Fleck, Vancouver, WA (US); Branimir Angelov, Sofia (BG)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/792,132

(22) Filed: Oct. 24, 2017

(65) Prior Publication Data

US 2018/0129314 A1    May 10, 2018

Related U.S. Application Data

(60) Provisional application No. 62/417,823, filed on Nov. 4, 2016.

(51) Int. Cl.
    *G06F 3/0354*      (2013.01)
    *G06F 3/038*      (2013.01)

(52) U.S. Cl.
    CPC ........ *G06F 3/03545* (2013.01); *G06F 3/0383* (2013.01)

(58) Field of Classification Search
    CPC .. G06F 3/03545; G06F 3/0383; G06F 3/0354; G06F 3/04883
    See application file for complete search history.

(56) References Cited

U.S. PATENT DOCUMENTS

| 5,206,785 A | 4/1993 | Hukashima |
| 5,732,600 A | 3/1998 | Peterson et al. |

(Continued)

FOREIGN PATENT DOCUMENTS

| JP | 4-96212 A | 3/1992 |
| JP | 5-275283 A | 10/1993 |

(Continued)

OTHER PUBLICATIONS

Wacom, "About setting pen pressure curve in the pen setting detail dialog box," screen capture of http://tablet-faq.wacom.co.jp/faq/show/215 on May 29, 2016, downloaded from https://web.archive.org/web/20160501000000*/tablet-faq.wacom.co.jp/faq/show/215, 4 pages (with English Translation).

*Primary Examiner* — MD Saiful A Siddiqui
(74) *Attorney, Agent, or Firm* — Seed IP Law Group LLP

(57) ABSTRACT

A stylus outputs an output value $P_O$ corresponding to a force $F_{org}$ applied to a core body of the stylus, and includes an MCU. The MCU sets profile data representing a correspondence relation between a primary pen pressure value $P_1$ and the output value $P_O$ based on a characteristic $f_1$ of a pen pressure detecting portion PD of the stylus. The profile data broadly or indirectly defines a relation h between the force $F_{org}$ and the output value $P_O$. The MCU repeatedly obtains the primary pen pressure value $P_1$ corresponding to the force $F_{org}$ from the pen pressure detecting portion PD. The MCU, each time the primary pen pressure value $P_1$ is obtained, obtains the output value $P_O$ from the primary pen pressure value $P_1$ based on the profile data and outputs the output value $P_O$. The stylus allows for decoupling (isolating) the configuration of the pen pressure detecting portion PD from the output value $P_O$ outputted from the stylus.

13 Claims, 32 Drawing Sheets

(56) References Cited

U.S. PATENT DOCUMENTS

| | | | |
|---|---|---|---|
| 5,745,712 A | 4/1998 | Turpin et al. | |
| 8,525,530 B2 | 9/2013 | Fukushima et al. | |
| 8,536,471 B2 | 9/2013 | Stern et al. | |
| 9,383,839 B1 * | 7/2016 | Rost | G06F 3/03545 |
| 2014/0253462 A1 * | 9/2014 | Hicks | G06F 3/03545 345/173 |
| 2015/0220198 A1 * | 8/2015 | Yoo | G06F 3/03545 345/173 |
| 2016/0154486 A1 | 6/2016 | Ogata et al. | |
| 2016/0195942 A1 * | 7/2016 | Chen | G06F 3/03545 345/179 |
| 2016/0320914 A1 * | 11/2016 | Tachikawa | G01L 1/205 |
| 2018/0081492 A1 * | 3/2018 | Kim | G06F 3/03545 |

FOREIGN PATENT DOCUMENTS

| | | | |
|---|---|---|---|
| JP | 6-242877 A | | 9/1994 |
| JP | 10-171586 A | | 6/1998 |
| JP | 2010-129920 A | | 6/2010 |
| JP | 2011-216512 A | | 10/2011 |
| JP | 2016-157322 | * | 1/2016 |
| JP | 2016-157322 A | | 9/2016 |
| WO | 2015/019883 A1 | | 2/2015 |

\* cited by examiner

F I G . 9
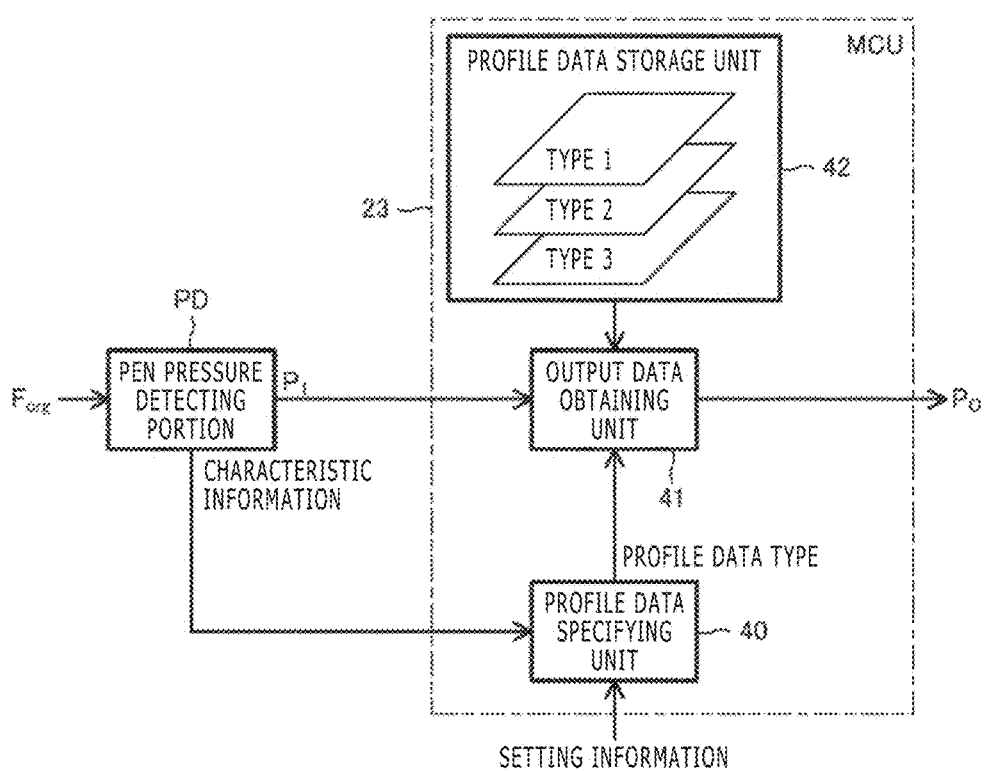

FIG.10

| SETTING INFORMATION N | | | | | | | |
|---|---|---|---|---|---|---|---|
| SETTING INFORMATION 1 | | | | | | | |
| PRESSURE SENSOR 21 | VARIABLE CAPACITANCE CAPACITOR | | | STRAIN GAGE | | ----- | ----- |
| CORE BODY 10 | HARD PLASTIC | BRUSH | ----- | HARD PLASTIC | BRUSH | ----- | ----- |
| $P_t$ | $P_D$ | | | | | | |
| ⋮ | ⋮ | ⋮ | ⋮ | ⋮ | ⋮ | | |
| 120.0 | 706.6 | | | | | | |
| 150.0 | 865.9 | | | | | | |
| 180.0 | 986.2 | | | | | | |
| 210.0 | 1106.3 | | | | | | |
| ⋮ | ⋮ | ⋮ | ⋮ | ⋮ | ⋮ | | |

PE

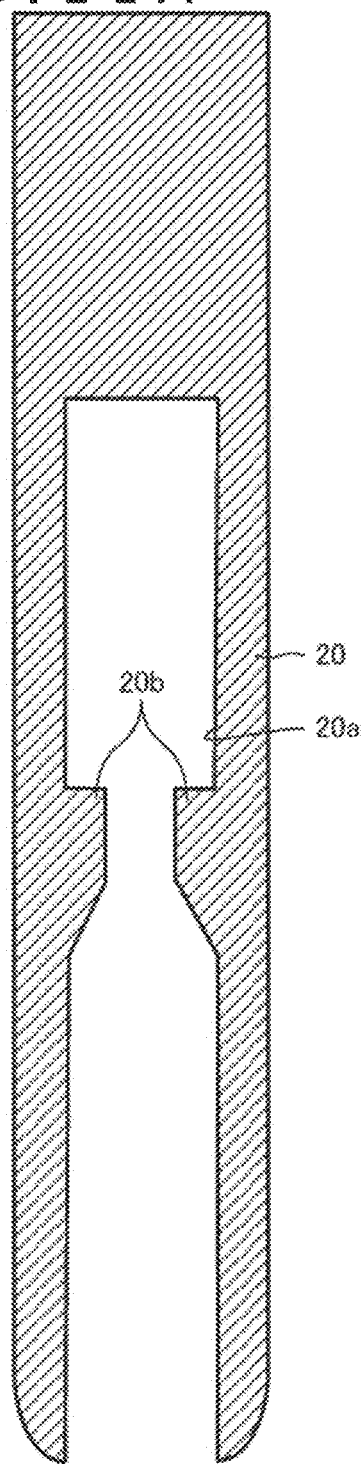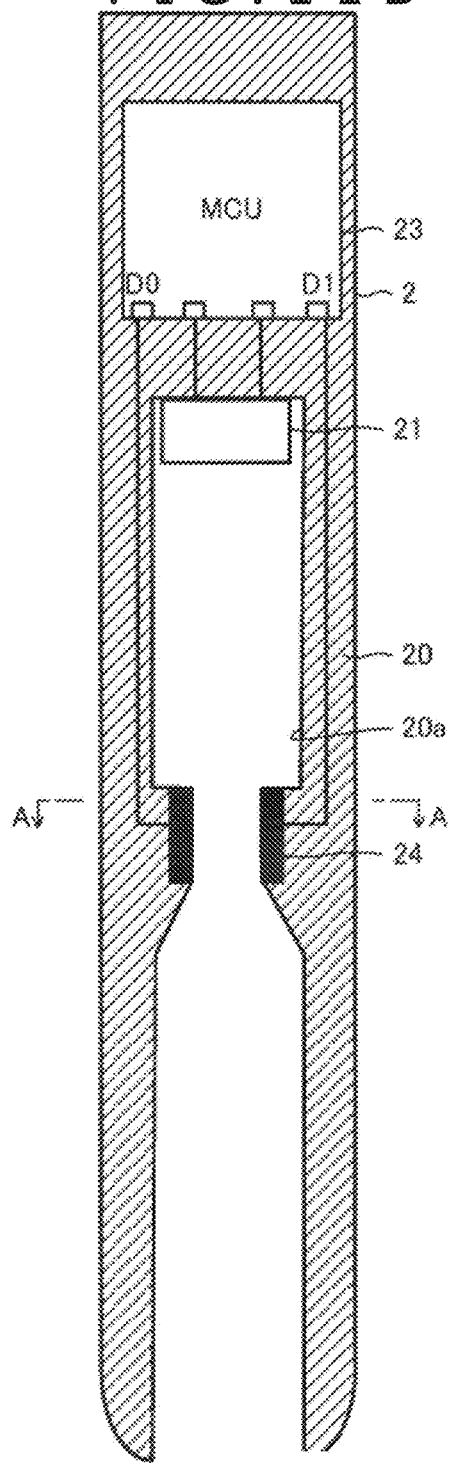

FIG.12A
FIG.12B
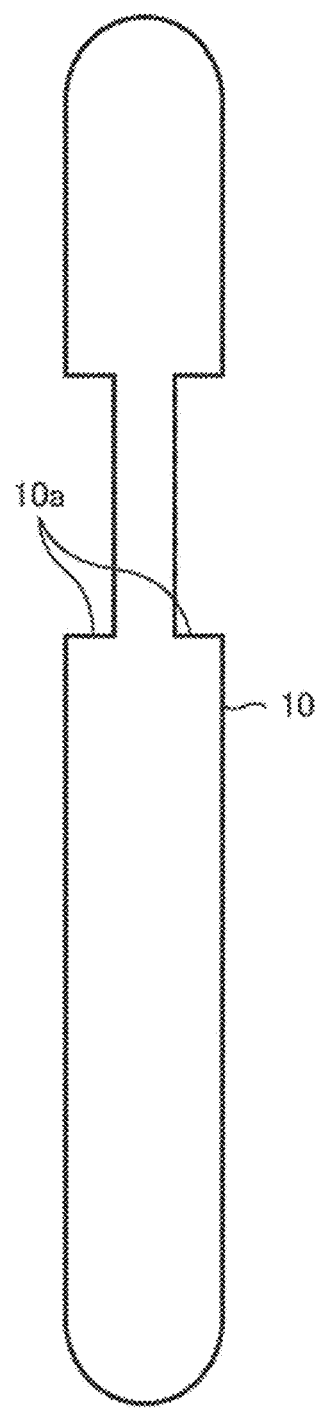
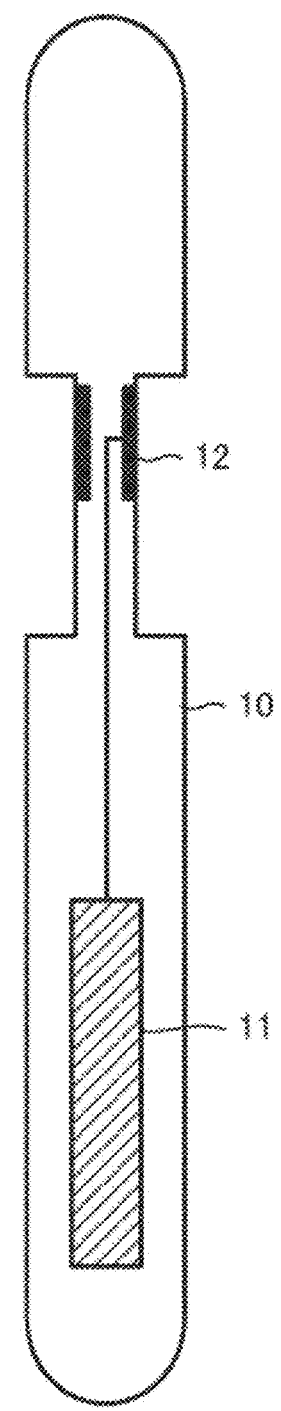

FIG.13A    FIG.13B    FIG.13C
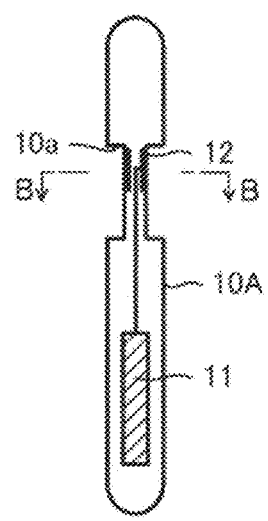
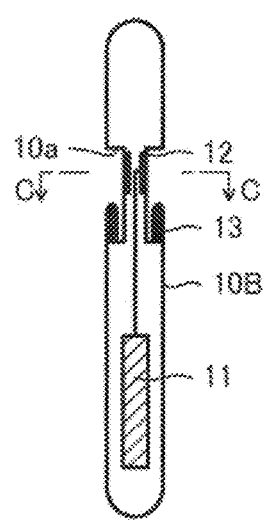
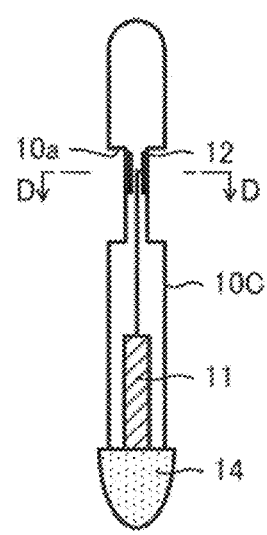
FIG.13D    FIG.13E    FIG.13F
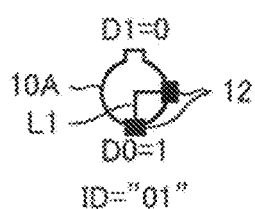
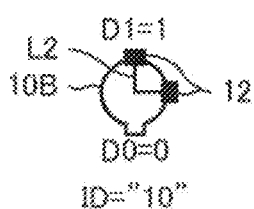
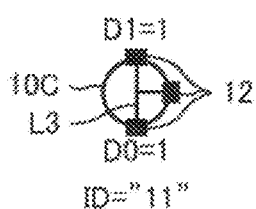

STYLUS, STYLUS SIGNAL PROCESSING METHOD, AND STYLUS SIGNAL PROCESSING DEVICE

BACKGROUND

Technical Field

The present disclosure relates to a stylus and a computer, method and processing device for processing stylus signal, and particularly to a stylus having a function of outputting a value corresponding to a force (pen pressure), a computer or a processing device used in conjunction with such a stylus, and a method performed in such a computer, processing device, or stylus.

Description of the Related Art

A stylus is known which includes a pressure sensor for detecting a force applied to a pen tip.

Patent Documents 1 to 4 describe a stylus including a pressure sensor formed of a variable capacitance capacitor. In the pressure sensor, when a force or a displacement applied to a core body increases, an area of contact between a dielectric and one electrode, which is pressed indirectly via the core body, increases, and a capacitance value between the one electrode and another electrode sandwiching the dielectric increases according to the increase in the contact area.

FIGS. 20 to 22 of Patent Document 4 show pen pressure characteristics of styluses including pen pressure detecting portions described in Patent Documents 1 to 3. The document shows that a pen pressure value increases in a logarithmic curve in response to increases in force, and that the shape of the curve differs depending on the shape of electrodes constituting a variable capacitance capacitor, the hysteresis characteristics of an elastic body, and the like.

Patent Document 5 describes a stylus including a pressure sensor formed of an optical sensor detecting an amount of displacement corresponding to a force applied to a pen tip (tip). FIG. 6 of the document shows an example in which the amount of displacement of the pen tip (tip) and detected voltage change linearly.

A detected pen pressure is converted into a digital output value by a sensor controller, which receives a signal including the pen pressure value transmitted from the stylus, or by a central processing unit (CPU) within the stylus as described in Patent Document 6 and Patent Document 7. A curve representing a relation between the force and the output value of the stylus is referred to as a "characteristic curve."

The obtained output value is supplied, together with a coordinate value, to an application via an operating system executing on a pen tablet driver. As the application draws a line so as to trace the trajectory of an indicated position, the application may change the line width, opacity, color, or the like of the line according to changes in the supplied output value. The attribute of the line which may be changed according to changes in the output value of the stylus is referred to as an "ink parameter."

Patent Document 8 discloses a method of converting, by a pen tablet driver, an output value, which is supplied from a coordinate detecting device including a predetermined stylus to a computer, into another kind of output value. This method allows a user to arbitrarily select a curve representing a relation between the output value before the conversion and the output value after the conversion.

Non Patent Document 1 discloses an example of a system that allows a user to set click pressure, pen pressure sensitivity, and a maximum pen pressure.

PRIOR ART DOCUMENTS

Patent Documents

Patent Document 1: Japanese Patent Laid-Open No. 1992-96212
Patent Document 2: Japanese Patent Laid-Open No. 1993-275283
Patent Document 3: Japanese Patent Laid-Open No. 2010-129920
Patent Document 4: Japanese Patent Laid-Open No. 2011-216512
Patent Document 5: U.S. Pat. No. 8,536,471
Patent Document 6: Japanese Patent No. 5732600
Patent Document 7: Japanese Patent No. 5745712
Patent Document 8: Japanese Patent Laid-Open No. 1994-242877

Non Patent Document

Non Patent Document 1: "A method of setting a pen pressure curve in a detailed setting dialog box for a pen touch," [online], on Sep. 4, 2013, Wacom Co., Ltd., [retrieved on Oct. 7, 2016], Internet <URL: http://tablet-faq.wacom.co.jp/faq/show/215>

BRIEF SUMMARY

Technical Problems

When the types of pressure sensors provided in styluses are different, different output values are output even when a force applied is the same. For example, the stylus disclosed in Patent Documents 1 to 4 outputs a pen pressure value in a logarithmically increasing relation to increases in the force, whereas the stylus disclosed in Patent Document 5 outputs a pen pressure value in a linearly increasing relation to increases in the force. A difference between the two pen pressure values is particularly large in a range of smaller forces (for example, a range of 100 grams-weight or less).

The output value of the stylus differs according to the pressure sensor as described above, and also changes according to the properties of a force transmitting mechanism including a core body holder of the stylus, a core body receiving a reaction force from an operating surface in response to a force applied to the core body holder by a user, and the like. The pressure sensor and the force transmitting mechanism may hereinafter be referred to collectively as a "pen pressure detecting portion."

Generally, different types of styluses mean different configurations of pen pressure detecting portions. Hence, different types of styluses lead to output of different output values in response to the same force (different characteristic curves). Then, even when the user applies the same force to a touch surface through the styluses, an ink parameter value output from an application differs merely because the types of styluses are different. Therefore standardization of the force response amongst different styluses is desired.

It is desirable to provide a stylus and a computer, method and processing device for processing stylus signal, which can isolate the configuration of a pen pressure detecting portion from a value output from the stylus.

Technical Solution

A stylus is provided that produces an output value corresponding to a force applied to a core body, wherein the stylus includes a pen pressure detecting portion and a processor, wherein the pen pressure detecting portion detects a primary pen pressure value corresponding to the force. The processor sets profile data representing a correspondence relation between the primary pen pressure value and the output value. The profile data is determined on the basis of a characteristic of the pen pressure detecting portion. The processor repeatedly obtains from the pen pressure detecting portion the primary pen pressure value corresponding to the force. The processor, each time the primary pen pressure value is obtained, obtains the output value from the primary pen pressure value on the basis of the profile data, and produces the output value.

According to the present disclosure, the output value is obtained from the primary pen pressure value on the basis of the profile data representing the correspondence relation between the primary pen pressure value and the output value, wherein the profile data is determined on the basis of the characteristic of the pen pressure detecting portion. Thus, the relation between the force applied to the core body and the output value of the stylus can be isolated (decoupled) from the specific configuration of the pen pressure detecting portion. That is, the relation between the force applied to the core body and the output value of the stylus can be fixed (standardized) irrespective of the configuration of the pen pressure detecting portion of the stylus.

Considered from another viewpoint, according to the present disclosure, the relation between the force applied to the core body (or the primary pen pressure value) and the output value of the stylus can be controlled arbitrarily without depending on the specific configuration of the pen pressure detecting portion. For example, when the profile data defining the same correspondence relation between the force (or the primary pen pressure value) and the output value is set in a plurality of styluses whose pen pressure detecting portions have different configurations, the same output value can be output for the same force (or the primary pen pressure value) even though the configurations of the pen pressure detecting portions are different from each other. Conversely, when the profile data defining different correspondence relations between the force (or the primary pen pressure value) and the output value are set in a plurality of styluses whose pen pressure detecting portions have the same configuration, different output values can be output for the same force (or the primary pen pressure value) even though the pen pressure detecting portions have the same configuration.

The stylus described above may further include a memory configured to store the profile data, and the output value may be obtained from the primary pen pressure value on the basis of the profile data stored in the memory. The profile data can be stored in the memory of the stylus.

In the styluses described above, the profile data may be set on the basis of setting information, which indicates the correspondence relation between the force and the output value and which is externally supplied to the stylus. Thus, the setting information can be set from the outside (for example, a sensor controller, or a computer connected to the sensor controller to perform ink processing) into the stylus.

In the styluses described above, the profile data may be set on the basis of characteristic information, which indicates the characteristic of the pen pressure detecting portion. The characteristic information is obtained by detecting a type of the pen pressure detecting portion. The stylus can obtain the characteristic information autonomously.

In the styluses described above, the processor may further detect that the pen pressure detecting portion is replaced, and when so detecting, may reobtain the characteristic information of the new pen pressure detecting portion and reset the profile data accordingly. Thus, the stylus can reobtain the characteristic information when the pen pressure detecting portion is replaced.

In the styluses described above, the profile data may include a first function indicative of the correspondence relation between the force and the output value, and an inverse function of a second function wherein the second function is indicative of a characteristic of the pen pressure detecting portion. The processor may obtain the force from the primary pen pressure value on the basis of the inverse function of the second function. The processor then obtains the output value from the obtained force on the basis of the first function. Thus, it is possible to first return (reverse) the primary pen pressure value back to the force, and then obtain the output value from the force. Hence, the relation between the force applied to the core body and the output value is isolated from the specific configuration of the pen pressure detecting portion.

Alternatively, in the styluses described above, the profile data may include a composite function, which is formed of a first function indicative of the correspondence relation between the force and the output value and an inverse function of a second function indicative of the characteristic of the pen pressure detecting portion. Using such composite function, the output value can be obtained directly from the primary pen pressure value, and thus less computationally intensively than in the case of first returning (reversing) the primary pen pressure value back to the force and then obtaining the output value from the force.

In the styluses described above, the memory may store a plurality of pieces of profile data in advance, and the processor may set the profile data by selecting one piece of profile data from the plurality of pieces of profile data stored in the memory. Thus, it is possible to avoid having to provide actual contents of the profile data to the stylus each time in use.

In the styluses described above, the plurality of pieces of profile data stored in the memory in advance may be stored in a form of look-up tables. Thus, it is possible to simplify arithmetic processing to obtain the output value, and to use a relation which may be otherwise difficult to express in the form of a simple function.

In the styluses described above, the memory may be a nonvolatile memory. Thus, the profile data can be retained even after power to the stylus is turned off.

In the styluses described above, the pen pressure detecting portion may include a pressure sensor formed of a capacitance switch or a strain gage. According to the present disclosure, if desired, the same pen pressure characteristic (i.e., the same correspondence relation between the force and the output value) can be obtained irrespective of whether the pressure sensor is either a capacitance switch or a strain gage.

In the styluses described above, the output value may be a secondary pen pressure value obtained by correcting the primary pen pressure value. Thus, a relation between the force applied to the core body and the secondary pen pressure value can be isolated (decoupled) from the specific configuration of the pen pressure detecting portion so as not to be dependent on the physical configuration of the pen pressure detecting portion.

A computer according to the present disclosure is used in conjunction with one of the styluses described above. The computer supplies the setting information to the stylus, and generates ink data on the basis of the output value output by the stylus. Thus, a relation between the force applied to the core body and the ink data can be isolated (decoupled) from the specific configuration of the pen pressure detecting portion.

In the computer described above, the output value may be an ink parameter indicating a line width or opacity of a line drawn by the computer on the basis of a series of coordinate data representing a trajectory of a position of the stylus. Thus, a relation between the force applied to the core body and the ink parameter can be isolated (decoupled) from the specific configuration of the pen pressure detecting portion.

A method according to the present disclosure is performed by a device outputting an output value corresponding to a force applied to a core body of a stylus. The method includes the device setting profile data representing a correspondence relation between a primary pen pressure value and the output value, wherein the profile data defines a correspondence relation between the force and the output value, and is determined on the basis of a pen pressure detection characteristic of the stylus. The method further includes the stylus repeatedly obtaining the primary pen pressure value corresponding to the force. The method further includes the device obtaining the output value from the primary pen pressure value obtained by the stylus on the basis of the profile data, and outputting the output value. Thus, a relation between the force applied to the core body and the output value of the device can be isolated (decoupled) from the specific configuration of the pen pressure detecting portion.

In the method described above, the device may identify the pen pressure detection characteristic based on a pen identification (ID) assigned to the stylus in advance. The device can identify the pen pressure detection characteristic from the pen ID.

In the methods described above, the stylus may have a pressure sensor and a force transmitting mechanism configured to transmit the force to the pressure sensor, and the pen pressure detection characteristic may be identified by at least one of a type of the pressure sensor and a type of the force transmitting mechanism.

In the methods described above, the device may be a processor disposed within the stylus. A relation between the force applied to the core body and the output value of the stylus can be isolated (decoupled) from the specific configuration of the pen pressure detecting portion.

In the methods described above, the device may be a sensor controller configured to detect a position of the stylus, and the sensor controller may obtain the primary pen pressure value from the stylus through a downlink signal transmitted by the stylus. A relation between the force applied to the core body and the output value of the sensor controller can be isolated (decoupled) from the specific configuration of the pen pressure detecting portion.

In the methods described above, the device may be a computer connected to a sensor controller configured to detect a position of the stylus, and the computer may obtain the primary pen pressure value from the stylus via the sensor controller. A relation between the force applied to the core body and the output value of the computer can be isolated (decoupled) from the specific configuration of the pen pressure detecting portion.

In the methods described above, the output value may be an ink parameter indicative of a width or opacity of a line, which is drawn based on a series of coordinate data representing a trajectory of a position of the stylus. A relation between the force applied to the core body and the line width or opacity of the drawn line can be isolated (decoupled) from the specific configuration of the pen pressure detecting portion.

A processing device according to the present disclosure is a Kth processing device among a first to the Kth processing devices, wherein the first processing device is configured to transform a force applied to a core body of a stylus into a first output value and to output the first output value. A kth processing device (k is an integer of 2 to K, and K is an integer of 2 or more) is configured to transform a (k−1)th output value from a (k−1)th processing device into a kth output value and to output the kth output value. The Kth processing device sets profile data representing a correspondence relation between a (K−1)th output value and a Kth output value based on characteristics of the first to (K−1)th processing devices. The profile data broadly or indirectly defines a correspondence relation between the (original) force and the Kth output value. The Kth processing device repeatedly obtains the (K−1)th output value from the (K−1)th processing device. The Kth processing device, each time the (K−1)th output value is obtained, obtains the Kth output value from the (K−1)th output value based on the profile data and outputs the Kth output value. Thus, a relation between the force applied to the core body and the Kth output value can be isolated (decoupled) from the specific configuration of the first to (K−1)th processing devices.

In the processing device described above, the first processing device may include a pressure sensor and a force transmitting mechanism configured to transmit the force to the pressure sensor, and the characteristics of the first to (K−1)th processing devices may be identified by at least one of a type of the pressure sensor and a type of the force transmitting mechanism.

Advantageous Effects

According to the present disclosure, the output value is obtained from the primary pen pressure value on the basis of the profile data representing a correspondence relation between the primary pen pressure value and the output value. The profile data, which directly defines the correspondence relation between the primary pen pressure value and the output value, further broadly or indirectly defines the correspondence relation between the force and the output value. The profile data is determined on the basis of the characteristic of the pen pressure detecting portion. Thus, the relation between the force applied to the core body and the output value of the stylus can be isolated (decoupled) from the specific configuration of the pen pressure detecting portion. That is, the relation between the force applied to the core body and the output value of the stylus can be fixed (standardized) irrespective of the configuration of the pen pressure detecting portion of the stylus.

Considered from another viewpoint, according to the present disclosure, the relation between the force applied to the core body and the output value of the stylus can be controlled arbitrarily without depending on the specific configuration of the pen pressure detecting portion. For example, when profile data defining the same correspondence relation between the force and the output value is set in a plurality of styluses whose pen pressure detecting portions have different configurations, the same output value can be output for the same force even though the configurations of the pen pressure detecting portions are different from each other. Conversely, when profile data defining different correspondence relations between the force and the output value are set in a plurality of styluses whose pen pressure detecting portions have the same configuration, different output values can be output for the same force even though the pen pressure detecting portions have the same configuration.

BRIEF DESCRIPTION OF THE SEVERAL VIEWS OF THE DRAWINGS

FIG. 9 is a schematic block diagram showing functional blocks of the stylus 2.

FIG. 10 is a diagram showing an example of profile data stored in a profile data storage unit 42 shown in FIG. 9.

FIG. 11A is a sectional view of a core body holder 20 shown in FIG. 2, and FIG. 11B is a diagram of the core body holder 20 of FIG. 11A including additional elements fixed thereto.

FIG. 12A is a sectional view of the core body 10 shown in FIG. 2, and FIG. 12B is a diagram of the core body 10 of FIG. 12A including additional elements fixed thereto.

FIG. 13A is a diagram showing a core body 10A according to a first variation of the core body 10, FIG. 13B is a diagram showing a core body 10B according to a second variation of the core body 10, FIG. 13C is a diagram showing a core body 10C according to a third variation of the core body 10, FIG. 13D is a sectional view of the core body 10A cut across line B-B of FIG. 13A, FIG. 13E is a sectional view of the core body 10B cut across line C-C of FIG. 13B, and FIG. 13F is a sectional view of the core body 10C cut across line D-D of FIG. 13C.

FIGS. 15A and 15B show diagrams depicting usage states of the stylus 2 having the core body 10A, wherein FIG. 15A shows a state in which a pen tip is not in contact with a panel surface 32, and FIG. 15B shows a state in which the pen tip is perpendicularly in contact with the panel surface 32.

FIGS. 28A and 28B are diagrams showing results of drawing using the position detecting system 1 according to the first embodiment of the present disclosure, wherein FIG. 28A represents a case where a brush type is an ink pen, and FIG. 28B represents a case where the brush type is a pencil (lead pencil).

DETAILED DESCRIPTION

Embodiments of the present disclosure will hereinafter be described in detail with reference to the accompanying drawings.

Figure 1A:
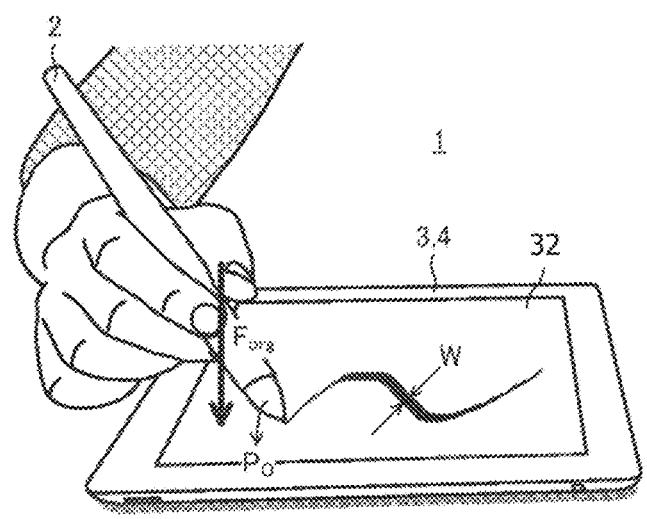
FIG. 1A is a diagram showing a usage state of a position detecting system 1 according to a first embodiment of the present disclosure.
Figure 1B:
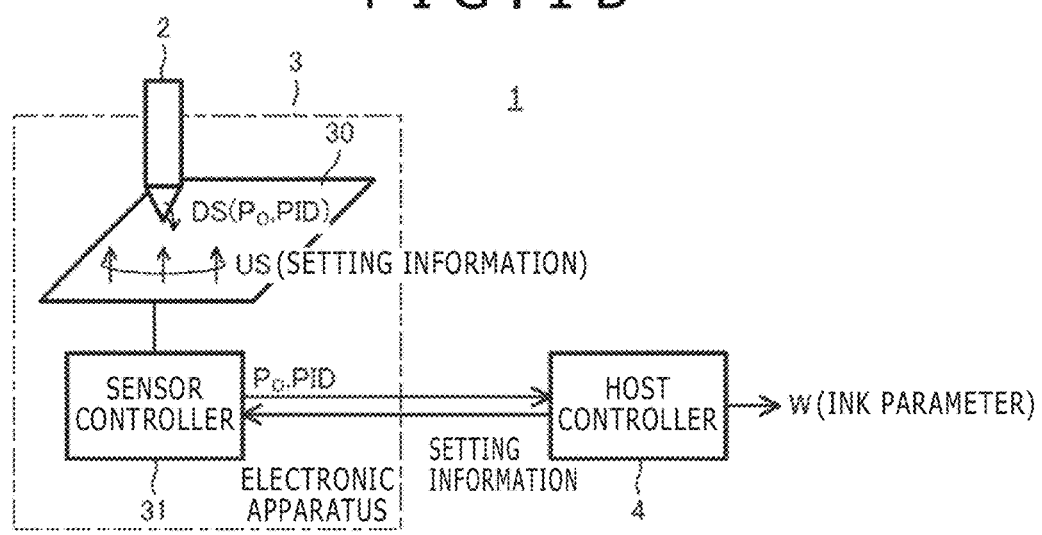
FIG. 1B is a diagram showing a system configuration of the position detecting system 1 shown in FIG. 1A.

FIG. 1A is a diagram showing a usage state of a position detecting system 1 according to a first embodiment of the present disclosure. FIG. 1B is a diagram showing a system configuration of the position detecting system 1 shown in FIG. 1A. As shown in these figures, the position detecting system 1 includes a stylus 2, an electronic apparatus 3, and a host controller 4.

The stylus 2 is an electronic apparatus having an external appearance similar to that of a pencil or a ballpoint pen. The stylus 2 is used by a user to write characters or pictures on a panel surface 32 of the electronic apparatus 3. The stylus 2 is an active stylus that operates on power supplied from a power supply (for example a battery) not shown in the figures. The stylus 2 is configured to be able to transmit and receive signals to and from the electronic apparatus 3 bidirectionally using an electrode 11 (see FIG. 2) disposed in a pen tip as an antenna. Hereinafter, a signal transmitted from the stylus 2 to the electronic apparatus 3 will be referred to as a downlink signal DS, and a signal transmitted from the electronic apparatus 3 to the stylus 2 will be referred to as an uplink signal US. The uplink signal US may include a touch driving signal, which is used to drive a sensor electrode to detect a finger in contact with the electronic apparatus 3, and which is detected (picked up) by the stylus 2.

The uplink signal US includes a command signal indicating an instruction (command) from a sensor controller 31 to the stylus 2. The downlink signal DS includes a position signal, which is a burst signal for allowing the sensor controller 31 to detect the position of the stylus 2, and a data signal indicating data responsive to the command indicated by the uplink signal US. The data transmitted by the downlink signal DS includes an output value $P_O$ corresponding to a force $F_{org}$ generated by the user by pressing the pen tip of the stylus 2 against the panel surface 32, a pen ID set in the stylus 2 in advance (i.e., information identifying the individual stylus 2, or a type of the stylus 2 wherein the type determines pen pressure detection characteristics, and is denoted as "PID" on the drawing), and the like.

Figure 2:
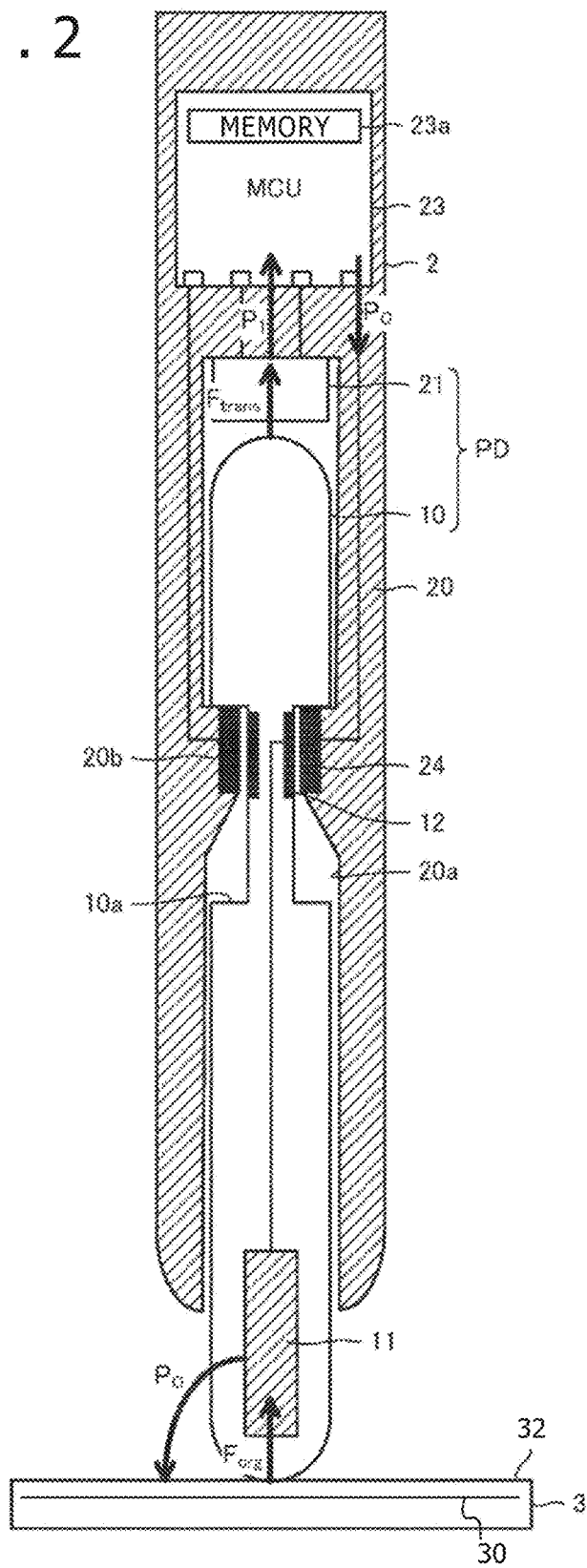
FIG. 2 is a sectional view of a stylus 2 shown in FIGS. 1A and 1B.

FIG. 2 is a sectional view of the stylus 2. As shown in the figure, the stylus 2 includes a core body 10 having an electrode 11 and a terminal 12, a pressure sensor 21, an MCU 23, and a core body holder 20 having a terminal 24.

The core body 10 is a substantially cylindrical member constituting the pen tip of the stylus 2. The stylus 2 is used in a state in which one (distal) end portion of the core body 10 abuts against the panel surface 32. Suitable material for the core body 10 is a material that is soft to such a degree as not to damage the panel surface 32 but is not easily deformed or damaged with a degree of force with which a human presses the stylus 2 against the panel surface 32. Concrete examples of such material include, for example, an elastomer such as a vinyl chloride resin or the like. The core body 10 includes a recessed portion 10a near the center in a longitudinal direction of the core body 10, wherein the recessed portion 50a is to engage with a projecting portion 20b of the core body holder 20 to be described later. The projecting portion 20b and the recessed portion 10a may be configured (or shaped) such that the core body 10 is detachable from the core body holder 20.

The electrode 11 is a conductor embedded in the vicinity of the one (distal) end portion of the core body 10. The terminal 12 is a conductor disposed at a position corresponding to the side surface (i.e., the surface along the longitudinal direction) of the recessed portion 10a of the core body 10. The electrode 11 and the terminal 12 are interconnected by a conductor disposed within the core body 10. The number of terminal(s) 12 is not limited to one, and a plurality of terminals 12 may be provided. Normally, two or three terminals 12 are provided. Reasons therefor and details thereof will be described later with reference to FIG. 13 and FIG. 14.

The core body holder 20 is a substantially cylindrical member held by the user. The core body holder 20 is formed of a material that is not easily broken, such as a metal, a plastic, or the like. While FIG. 2 illustrates an example in which the core body holder 20 is integrally formed as one (unitary) member, the core body holder 20 may be formed of a plurality of members combined together. In addition, a casing (or cover) may be provided on the outside of the structure shown in FIG. 2, and the entire structure inclusive of the casing may be referred to as the core body holder 20.

The core body holder 20 is provided with a hollow portion 20a having an opening at the tip of the stylus 2. The core body 10 is housed within the hollow portion 20a in a state in which only the one (distal) end portion of the core body 10 is exposed through the opening. The projecting portion 20b is disposed on the inner surface of the hollow portion 20a to engage with the recessed portion 10a of the core body 10.

The pressure sensor 21 is a sensor disposed at the deepest part of the hollow portion 20a. The pressure sensor 21 is fixed to the core body holder 20. A pressure detecting surface of the pressure sensor 21 is disposed on the core body 10 side, and is in contact with another (proximal) end portion of the core body 10. The pressure sensor 21 plays a role of transforming a force $F_{trans}$ applied from the core body 10 to the pressure detecting surface into a primary pen pressure value $P_1$ as a digital value, and supplying the primary pen pressure value $P_1$ to the MCU 23. Specifically, various types of sensors such as a capacitive sensor, a strain gage, and the like can be used as the pressure sensor 21 (see FIGS. 19 to 21 to be described later). The pressure sensor 21 may be configured to be replaceable as in the case of the core body 10.

Here, the inside diameter of the hollow portion 20a is set at a value slightly larger than the diameter of the core body 10. As a result, the core body 10 is movable in the hollow portion 20a in the longitudinal direction of the hollow portion 20a by a minute amount (distance). The core body 10 thereby functions as a force transmitting mechanism that transmits a force $F_{org}$, which is generated by the user by pressing the pen tip of the stylus 2 (the distal end portion of the core body 10) against the panel surface 32, to the pressure sensor 21 abutting against the other (proximal) end portion of the core body 10. In addition, the core body 10 and the pressure sensor 21 cooperate with each other to play the role of a pen pressure detecting portion PD that detects the primary pen pressure value $P_1$ corresponding to the force $F_{org}$. The force $F_{trans}$ applied to the pressure detecting surface of the pressure sensor 21 may be the same value as the force $F_{org}$, or may be a value different from the force $F_{org}$, depending on various conditions. FIG. 2 illustrates a case where the force $F_{trans}$ and the force $F_{org}$ are the same ($F_{trans}=F_{org}$). Examples in which the force $F_{trans}$ and the force $F_{org}$ are different from each other ($F_{trans} \neq F_{org}$) will be described later with reference to FIGS. 14 to 17.

The terminal 24 is a conductor disposed at a top surface of the projecting portion 20b on an inner surface of the hollow portion 20a. The terminal 24 is configured to be in contact with the terminal 12 of the core body 10 inserted in the hollow portion 20a. The number of terminal(s) 24 is not limited to one. Normally, three terminals 24 are provided. Reasons therefor and details thereof will be described later with reference to FIG. 13 and FIG. 14. The terminal 24 is electrically connected to the MCU 23 by a conductor disposed within the core body holder 20. The MCU 23 is thereby electrically connected to the electrode 11 via the terminals 12 and 24.

The MCU 23 is a processor having a nonvolatile memory 23a. The MCU 23 is configured to operate according to a program and data stored in the memory 23a in advance. Details of processing performed by the MCU 23 will be described later with reference to FIGS. 3 to 8. An outline of the processing performed by the MCU 23 will be described here. The MCU 23 is configured to receive the uplink signal US arriving at the electrode 11 through the terminals 12 and 24, and perform processing corresponding to the received uplink signal US. This processing includes using the timing of reception of the uplink signal US to determine the subsequent schedule of reception of the uplink signal US and transmission of the downlink signal DS, and receiving the uplink signal US and transmitting the downlink signal DS according to the determined schedule. This processing further includes obtaining data corresponding (responsive) to a command indicated by the uplink signal US, and transmitting the data in the downlink signal DS. The transmission of the downlink signal DS is performed by the MCU 23, which supplies the downlink signal DS to the electrode 11 through the terminals 24 and 12.

The data transmitted by the MCU 23 in a state of being included in the downlink signal DS includes the output value $P_O$ corresponding to the force $F_{org}$, as described above. Accordingly, the MCU 23 stores profile data in the memory 23a in advance, and performs processing of obtaining the output value $P_O$ from the primary pen pressure value $P_1$ on the basis of the profile data. Because the stylus 2 performs this processing, the present embodiment can isolate (decouple) a relation between the force $F_{org}$ applied to the core body 10 and the output value $P_O$ of the stylus 2 from the specific configuration of the pen pressure detecting portion PD. Details of such decoupling will be described later with reference to FIGS. 3 to 8.

The MCU 23 is also configured to have a function of determining respective types of the inserted core body 10 and the pressure sensor 21. The MCU 23 determines the type of the core body 10 by detecting a contact state between the terminal(s) 24 and the terminal(s) 12 (details will be described later with reference to FIG. 11 and FIG. 12). On the other hand, the MCU 23 determines the type of the pressure sensor 21 through exchange of electric signals with the pressure sensor 21.

The description returns to FIG. 1. The electronic apparatus 3 is a tablet or a digitizer having the panel surface 32. As shown in FIG. 1B, the electronic apparatus 3 includes a sensor electrode 30 and a sensor controller 31. Of the sensor electrode 30 and the sensor controller 31, the sensor electrode 30 is formed of a plurality of linear electrodes (not shown) arranged in the form of a matrix directly under the panel surface 32.

The sensor controller 31 is configured to be able to transmit and receive signals to and from the stylus 2 bidirectionally using the sensor electrode 30 as an antenna. The sensor controller 31, when transmitting the uplink signal US, obtains a command signal indicating an instruction (command) to be transmitted to the stylus 2, and transmits the uplink signal US including the obtained command signal. In addition, the sensor controller 31, when receiving a position signal as the downlink signal DS, detects the position of the stylus 2 on the panel surface 32 on the basis of the reception strength of the position signal in each of the linear electrodes constituting the sensor electrode 30, and outputs coordinate data indicating the detected position to the host controller 4. On the other hand, the sensor controller 31, when receiving a data signal as the downlink signal DS, obtains data transmitted by the stylus 2 by decoding the received data signal, and outputs the data to the host controller 4.

The host controller 4 is a computer that performs drawing processing (also referred to as "inking" processing) on a display (not shown in the figures) on the basis of a series of coordinate data (series of coordinate data indicating the trajectory of the position of the stylus 2) supplied from the sensor controller 31. The host controller 4 may be formed integrally with the electronic apparatus 3 and the display, or may be formed separately from the electronic apparatus 3 and the display. Examples corresponding to the former include an example in which the host controller 4, the electronic apparatus 3, and the display are formed integrally with each other as a tablet computer as shown in FIG. 1A. Examples corresponding to the latter include an example in which the electronic apparatus 3 is formed as a digitizer (not shown), and the host controller 4 and the display are formed as a so-called personal computer (a notebook type, a desktop type, or the like).

The drawing processing performed by the host controller 4 carries out processing based on a brush type, such as an ink pen, a pencil (lead pencil), or the like, color information, and the like, and performs processing based on an ink parameter including at least one of a line width (line width W shown in FIG. 1A) and opacity of a line drawn on the basis of the series of coordinate data. The host controller 4 is configured to obtain the ink parameter on the basis of the output value $P_O$ supplied from the sensor controller 31. The ink parameter may be generated within the stylus 2. In that case, the output value $P_O$ is the ink parameter itself. Thus, it suffices for the host controller 4 to obtain the output value $P_O$ as the ink parameter. On the other hand, when the output value $P_O$ of the stylus 2 is a pen pressure value (secondary pen pressure value generated by the MCU 23 shown in FIG. 2 on the basis of the primary pen pressure value $P_1$ supplied from the pressure sensor 21), it is necessary to perform, within the host controller 4, processing of generating the ink parameter on the basis of the output value $P_O$.

The host controller 4 is also configured to supply setting information representing correspondence relation between the force $F_{org}$ and the output value $P_O$ to the sensor controller 31. The setting information, which will be described later in detail, is for example a function or a look-up table for calculating the output value $P_O$ from the force $F_{org}$. Given that the setting information determines the output value $P_O$ (as the secondary pen pressure value, line width, transparency, or the like) from the force $F_{org}$ (rather than from a digital value such as the primary pen pressure value $P_1$), the setting information may be referred to as a force response curve.

Receiving the supplied setting information, the sensor controller 31 transmits the uplink signal US including the setting information to the stylus 2. In the present embodiment, because the setting information is thus supplied to the stylus 2, the output value $P_O$ of the stylus 2 is isolated (decoupled) from the pen pressure detection characteristic of the stylus 2. That is, as viewed from the user of the host controller 4, the correspondence relation between the force $F_{org}$ and the output value $P_O$ can be fixed (standardized) to the correspondence relation represented by the setting information, regardless of the structure of the pen pressure detecting portion PD of the stylus 2, as will be more fully described below in reference to FIGS. 3 to 8.

Figure 3A:
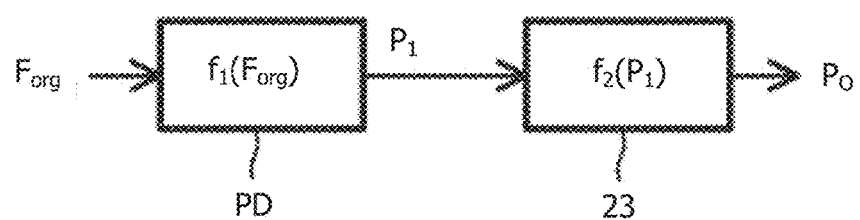
FIG. 3A is a diagram showing processing of a pen pressure detecting portion PD and a micro controller unit (MCU) 23 shown in FIG. 2.
Figure 3B:
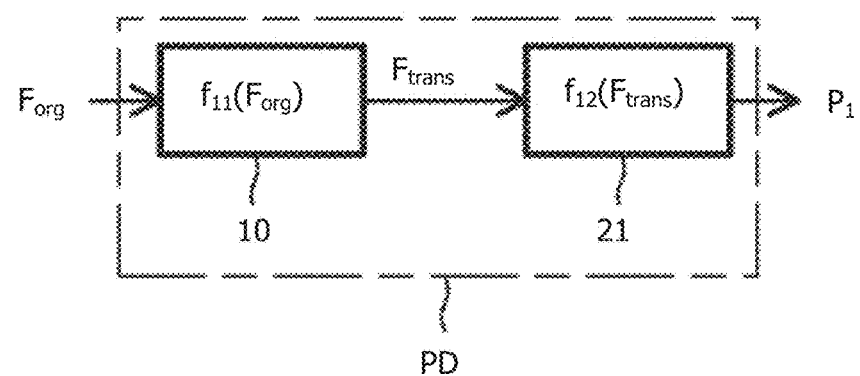
FIG. 3B is a diagram showing processing of a core body 10 and a pressure sensor 21 shown in FIG. 2.

FIG. 3A is a diagram showing processing of the pen pressure detecting portion PD and the MCU 23 shown in FIG. 2. FIG. 3B is a diagram showing processing of the core body 10 (force transmitting mechanism) and the pressure sensor 21 shown in FIG. 2.

As shown in FIG. 3A, the pen pressure detecting portion PD is a functional unit that obtains the primary pen pressure value $P_1$ from the force $F_{org}$ applied to the pen tip. Supposing that the correspondence relation between the force $F_{org}$ and the primary pen pressure value $P_1$ is expressed by a function $f_1$, the primary pen pressure value is expressed as $P_1=f_1(F_{org})$. As is also shown in FIG. 3B, the pen pressure detecting portion PD is formed of the core body 10 and the pressure sensor 21. The core body 10 is a functional unit that obtains the force $F_{trans}$ from the force $F_{org}$. The pressure sensor 21 is a functional unit that obtains the primary pen pressure value $P_1$ from the force $F_{trans}$. Supposing that the correspondence relation between the force $F_{org}$ and the force $F_{trans}$ and the correspondence relation between the force $F_{trans}$ and the primary pen pressure value $P_1$ are expressed by functions $f_{11}$ and $f_{12}$, respectively, the transmitted force is expressed as $F_{trans}=f_{11}(F_{org})$ and the primary pen pressure value is expressed as $P_1=f_{12}(F_{trans})$. When the functions $f_{11}$ and $f_{12}$ are used, the function $f_1$ can be expressed as a composite function $f_{11}\bigcirc f_{12}$ of these functions $f_{11}$ and $f_{12}$. That is, $P_1=f_{11}\bigcirc f_{12}(F_{org})=f_{12}(f_{11}(F_{org}))$.

As shown in FIG. 3A, the MCU 23 is a functional unit that obtains the output value $P_O$ from the primary pen pressure value $P_1$. Supposing that the correspondence relation between the primary pen pressure value $P_1$ and the output value $P_O$ is expressed by a function $f_2$, the output value is expressed as $P_O=f_2(P_1)$.

Figure 4:
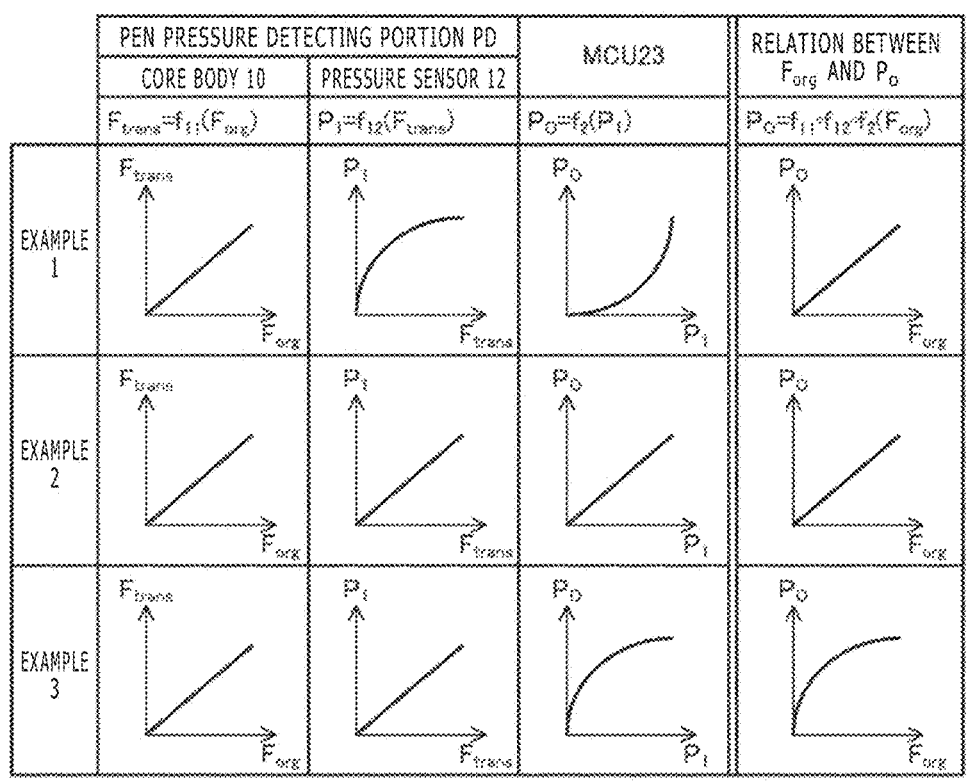
FIG. 4 is a diagram showing various examples of relations between a force $F_{org}$ applied to the core body 10 and an output value $P_O$ of the MCU 23.

FIG. 4 is a diagram showing various examples of the relation between the force $F_{org}$ applied to the core body 10 and the output value $P_O$ of the MCU 23. As shown in the figure, when the functions $f_{11}$, $f_{12}$, and $f_2$ are used, the output value $P_O$ is expressed as $P_O=f_{11}\bigcirc f_{12}\bigcirc f_2(F_{org})=f_2(f_{12}(f_{11}(F_{org})))$. The relation between the force $F_{org}$ and the output value $P_O$, which is expressed by such a composite function $f_{11}\bigcirc f_{12}\bigcirc f_2$, will be described using three examples 1 to 3 shown in FIG. 4.

Example 1 is an example in which the function $f_{11}$ is a linear function, the function $f_{12}$ is a logarithmic function, and the function $f_2$ is an exponential function having the same base as the function $f_{12}$. In this case, the composite function $f_{11}\bigcirc f_{12}\bigcirc f_2$ is a linear function, and the output value Po has a linear relation with the force $F_{org}$, as shown in FIG. 4.

Example 2 is an example in which the functions $f_{11}$, $f_{12}$, and $f_2$ are each a linear function. In this case, the composite function $f_{11}\bigcirc f_{12}\bigcirc f_2$ is also a linear function, and the output value $P_O$ has a linear relation with the force $F_{org}$, as shown in FIG. 4.

Example 3 is an example in which the functions $f_{11}$ and $f_{12}$ are linear functions, and the function $f_2$ is a logarithmic function. In this case, the composite function $f_{11}\bigcirc f_{12}\bigcirc f_2$ is a logarithmic function, and the output value $P_O$ has a logarithmic relation with the force $F_{org}$, as shown in FIG. 4.

It is understood from Examples 1 and 2 that even when the configuration of the pen pressure detecting portion PD is different, the relation between the force $F_{org}$ and the output value $P_O$ can be made to be the same, depending on the processing by the MCU 23. On the other hand, it is understood from Examples 2 and 3 that even when the configuration of the pen pressure detecting portion PD is the same, the relation between the force $F_{org}$ and the output value $P_O$ can be made different, depending on the processing by the MCU 23. It can be said from the above that the relation between the force $F_{org}$ and the output value $P_O$ can be controlled arbitrarily by control of processing contents of the MCU 23. It is an object of the present disclosure to isolate (decouple) the relation between the force $F_{org}$ and the output value $P_O$ from the specific configuration of the pen pressure detecting portion PD, by utilizing such properties of the relation between the force $F_{org}$ and the output value $P_O$. Specifically, the MCU 23 is made to set profile data representing correspondence relation between the primary pen pressure value $P_1$ and the output value $P_O$, obtain the output value $P_O$ from the primary pen pressure value $P_1$ on the basis of this profile data, and output the output value $P_O$. The profile data, though directly representing the correspondence relation between the primary pen pressure value $P_1$ and the output value $P_O$, thus indirectly defines the correspondence relation between the force $F_{org}$ and the output value $P_O$. The profile data is determined on the basis of a characteristic of the pen pressure detecting portion PD. Such processing of the MCU 23 will be described in detail in the following.

Figure 5:
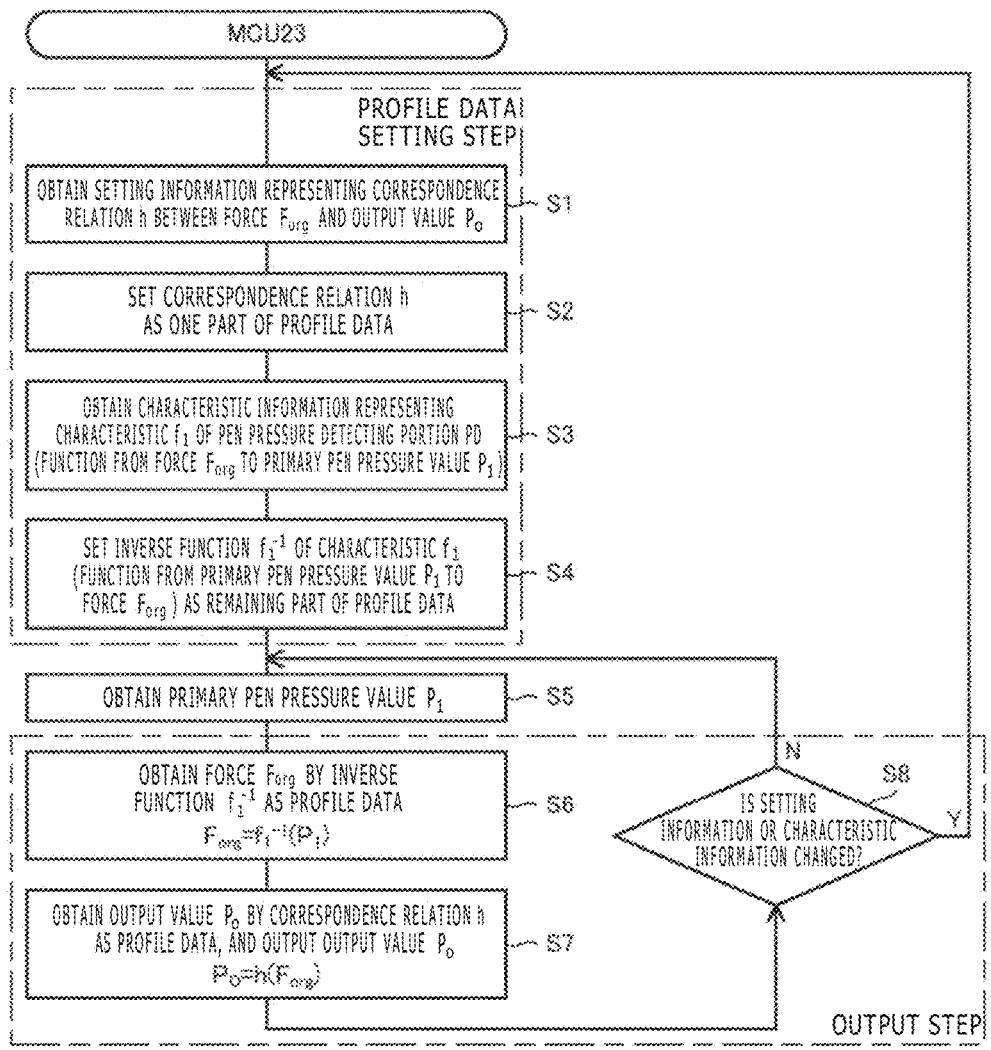
FIG. 5 is a flowchart illustrating a first example of processing of the MCU 23 shown in FIG. 2.

FIG. 5 is a flowchart illustrating a first example of the processing of the MCU 23. The MCU 23 according to the present example first performs a profile data setting step (steps S1 to S4) of setting profile data representing the correspondence relation between the primary pen pressure value $P_1$ and the output value $P_O$. As discussed above, the profile data may indirectly define the correspondence relation between the force $F_{org}$ and the output value $P_O$, and is determined on the basis of the characteristic of the pen pressure detecting portion PD.

The profile data is data for realizing the above-described force response curve. In the first example of the processing of the MCU 23 shown in FIG. 5, the profile data is formed of data representing correspondence relation h between the force $F_{org}$ and the output value $P_O$ and the characteristic $f_1$ of the pen pressure detecting portion PD. On the other hand, in a second example of the processing of the MCU 23 shown in FIG. 7 to be described later, the profile data is formed of data representing a correspondence relation $f_2$ between the primary pen pressure value $P_1$ and the output value $P_O$.

Returning to FIG. 5, the MCU 23 that has started the profile data setting step first obtains setting information representing the correspondence relation h between the force $F_{org}$ and the output value $P_O$ (step S1). The correspondence relation h is a function (first function) from the force $F_{org}$ to the output value $P_O$, and is expressed as $P_O=h(F_{org})$. As described above, the setting information is supplied from the host controller 4, which is an external device as viewed from the stylus 2, to the stylus 2 via the sensor controller 31. The MCU 23 sets the correspondence relation h represented by the obtained setting information as a part of the profile data, and stores the part of the profile data in the memory 23a (step S2).

The MCU 23 next obtains characteristic information representing the characteristic $f_1$ of the pen pressure detecting portion PD (step S3). As described above, the characteristic $f_1$ is a function (second function) that converts the force $F_{org}$ to the primary pen pressure value $P_1$, and is expressed as $P_1=f_1(F_{org})$. The MCU 23 detects the type of the pen pressure detecting portion PD through electric connection to the terminal 24($s$) shown in FIG. 2, and obtains the characteristic information on the basis of a result of the detection. Thereafter, the MCU 23 sets an inverse function $f_1^{-1}$ of the characteristic $f_1$ represented by the thus obtained characteristic information as a remaining part of the profile data, and stores the remaining part of the profile data in the memory 23a (step S4).

The profile data setting step is completed by performing the processing of the above steps S1 to S4. After completing the setting of the profile data, the MCU 23 repeatedly performs a primary pen pressure value obtaining step of obtaining the primary pen pressure value $P_1$ from the pen pressure detecting portion PD (step S5). Each time the MCU 23 performs the primary pen pressure value obtaining step, the MCU 23 performs an output step of obtaining the output value $P_O$ from the primary pen pressure value $P_1$ on the basis of the profile data stored in the memory 23a (steps S6 to S8). Incidentally, the MCU 23 may perform the primary pen pressure value obtaining step periodically, or may perform the primary pen pressure value obtaining step when receiving a command requiring the transmission of the output value $P_O$. Details of the output step will be described in the following.

The MCU 23 first obtains the force $F_{org}$ from the primary pen pressure value $P_1$ by the inverse function $f_1^{-1}$ of the characteristic $f_1$ wherein the inverse function is stored as part of the profile data in the memory 23a (step S6). Specifically, the force $F_{org}$ is obtained from the primary pen pressure value $P_1$ by performing an operation of $F_{org}=f_1^{-1}(P_1)$. The MCU 23 next obtains the output value $P_O$ from the force $F_{org}$ obtained in step S6 on the basis of the correspondence relation h stored as part of the profile data in the memory 23a (step S7). Specifically, the output value $P_O$ is obtained from the force $F_{org}$ by performing an operation of $P_O=h(F_{org})$. The MCU 23 includes the output value $P_O$ obtained by the processing thus far in the downlink signal DS, and transmits the downlink signal DS directed to the host controller 4 via the sensor controller 31.

After completion of step S7, the MCU 23 determines whether or not the setting information or the characteristic information is changed (step S8). As for the setting information, the MCU 23 makes the determination in step S8 by determining whether or not new setting information is received from the outside (specifically from the host controller 4 via the sensor controller 31). On the other hand, as for the characteristic information, the MCU 23 performs, in step S8, a replacement detecting step of detecting whether the pen pressure detecting portion PD is replaced or not. This detection, which is performed using the terminals 12 and 24 shown in FIG. 2, will be described later in detail with reference to FIG. 11 and FIG. 12. The MCU 23 determines that the characteristic information is changed when detecting the replacement of the pen pressure detecting portion PD as a result of performing the replacement detecting step.

Determining in step S8 that there is a change, the MCU 23 returns to step S1 to perform the profile data setting step (steps S1 to S4) again. Thereby, the setting information and the characteristic information are reobtained, and the profile data is reset. When determining in step S8 that there is no change, on the other hand, the MCU 23 returns to step S5 to repeat the obtainment of the primary pen pressure value $P_1$ and the output value $P_O$.

Figure 6:
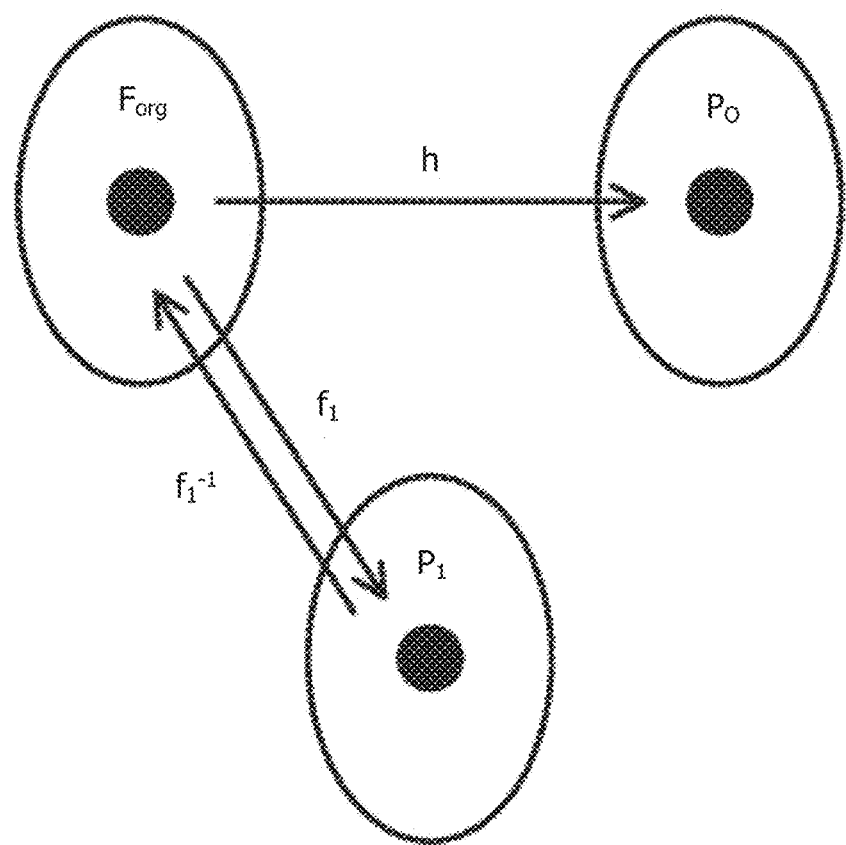
FIG. 6 is a diagram illustrating processing of an output value obtaining step shown in FIG. 5 from another viewpoint.

FIG. 6 is a diagram illustrating the processing of the output step shown in FIG. 5 from another viewpoint. Ellipses shown in the figure (ellipses within which a black circle is shown) represent data (the force $F_{org}$, the primary pen pressure value $P_1$, and the output value $P_O$) processed in the present embodiment. As shown in the figure, the pen pressure detecting portion PD first transforms the force $F_{org}$ into the primary pen pressure value $P_1$. Next, the MCU 23 inversely transforms the primary pen pressure value $P_1$ into the force $F_{org}$. When the characteristic of the pen pressure detecting portion PD is expressed as the characteristic information $f_1$, this inverse transformation is expressed as $f_1^{-1}$. The MCU 23 finally transforms the force $F_{org}$ into the output value $P_O$ by using the correspondence relation h represented by the setting information. The stylus 2 according to the present example thus once returns (reverses) the primary pen pressure value $P_1$ back to the force $F_{org}$ by using the inverse function $f_1^{-1}$ of the characteristic $f_1$, and then obtains the output value $P_O$ from the force $F_{org}$ by using the correspondence relation h. As a result, the relation between the force $F_{org}$ and the output value $P_O$ is isolated (decoupled) from the specific configuration (that is, the characteristic $f_1$) of the pen pressure detecting portion PD.

Figure 7:
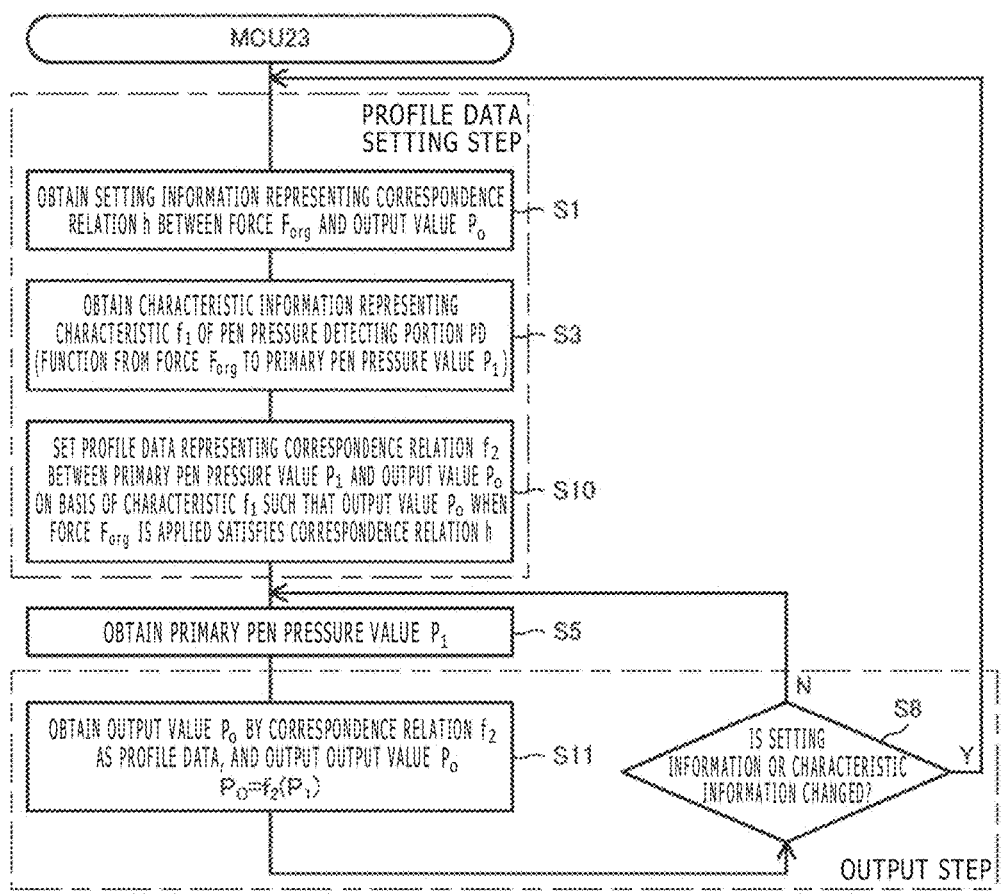
FIG. 7 is a flowchart illustrating a second example of processing of the MCU 23 shown in FIG. 2.

FIG. 7 is a flowchart illustrating a second example of the processing of the MCU 23. In the first example described with reference to FIG. 5 and FIG. 6, the MCU 23 once returns (reverses) the primary pen pressure value $P_1$ to the force $F_{org}$ by using the inverse function $f_1^{-1}$ of the characteristic $f_1$, and then obtains the output value $P_O$ from the force $F_{org}$ by using the correspondence relation h. On the other hand, in the present example, the force $F_{org}$ is directly transformed into the output value $P_O$ by using a composite function $f_1^{-1}\bigcirc h$ of the inverse function $f_1^{-1}$ and the correspondence relation h, in order to lighten an arithmetic load on the MCU 23. In the following, detailed description will be made centering on differences from the first example.

As is understood from a comparison between FIG. 7 and FIG. 5, in the present example, step S10 is performed in place of steps S2 and S4, and step S11 is performed in place of steps S6 and S7.

Step S10 is performed after steps S1 and S3 are performed. Specifically, the MCU 23 generates profile data representing the correspondence relation $f_2$ between the primary pen pressure value $P_1$ and the output value $P_O$ on the basis of the characteristic $f_1$ represented by the characteristic information obtained in step S3 such that the output value $P_O$ when the force $F_{org}$ is applied satisfies the correspondence relation h represented by the setting information obtained in step S1. The MCU 23 then stores the profile data in the memory 23a. The correspondence relation $f_2$ is a composite function $f_1^{-1}\bigcirc h$ of a function h (first function), which is indicative of the correspondence relation between the force $F_{org}$ and the output value $P_O$ as represented by the setting information, and the inverse function $f_1^{-1}$ of the function $f_1$ (second function), which is indicative of the characteristic represented by the characteristic information of the pen pressure detecting portion. The profile data in this example is data identifying this composite function $f_1^{-1}\bigcirc h$.

In step S11, the MCU 23 obtains the output value $P_O$ directly from the primary pen pressure value $P_1$ on the basis of the correspondence relation $f_2=f_1^{-1}\bigcirc h$ stored as the profile data in the memory 23a. That is, the output value $P_O$ is obtained by performing an operation of $P_O=f_2(P_1)=f_1^{-1}\bigcirc h(P_1)$. Thus, in the present example, the composite function is applied only once, unlike the example of FIG. 5 in which two functions are applied in two steps, so that the output value $P_O$ can be obtained less computationally intensively in the present example.

Figure 8:
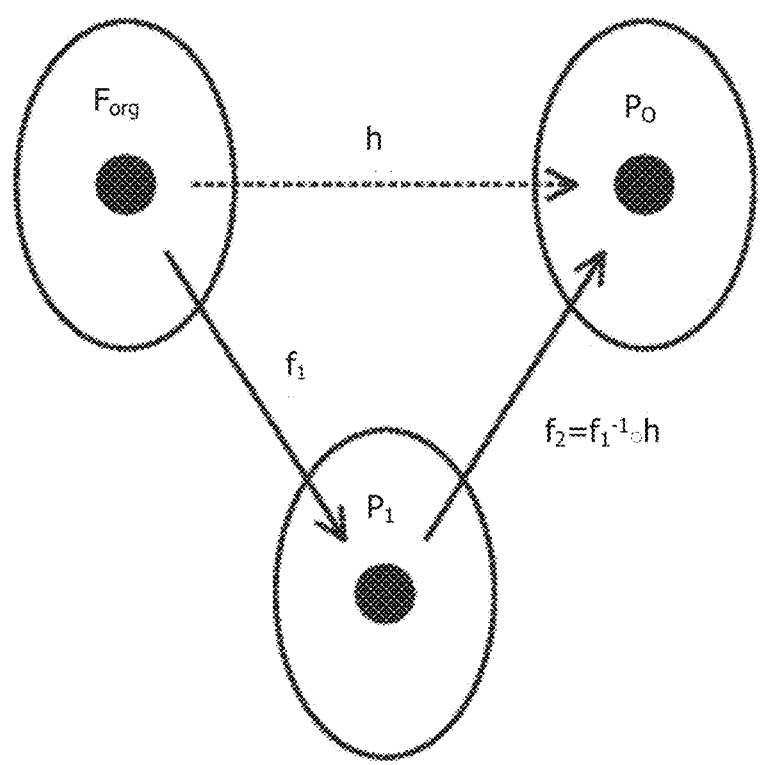
FIG. 8 is a diagram illustrating processing of an output value obtaining step shown in FIG. 7 from another viewpoint.

FIG. 8 is a diagram illustrating the processing of the output step shown in FIG. 7 from another viewpoint. As shown in the figure, also in this case, the pen pressure detecting portion PD first transforms the force $F_{org}$ into the primary pen pressure value $P_1$. This is similar to the example of FIG. 6. Next, the MCU 23 transforms the primary pen pressure value $P_1$ directly into the output value $P_O$ by using the composite function $f_2$ $f_1^{-1}\bigcirc h$ of the correspondence relation h represented by the setting information and the inverse function $f_1^{-1}$ of the characteristic $f_1$ of the pen pressure detecting portion PD represented by the characteristic information. Thus, the stylus 2 according to the present example directly obtains the output value $P_O$ from the primary pen pressure value $P_1$ by using the composite function $f_1^{-1}\bigcirc h$. As a result, the relation between the force $F_{org}$ and the output value $P_O$ is isolated (decoupled) from the specific configuration (that is, the characteristic $f_1$) of the pen pressure detecting portion PD.

FIG. 9 is a schematic block diagram showing functional blocks of the stylus 2 that implements the processing according to the example shown in FIG. 7 and FIG. 8. FIG. 9 represents a case where a look-up table is used as a concrete method of calculating the output value $P_O$ using the composite function $f_1^{-1} \bigcirc h$. Detailed description thereof will be made in the following.

As shown in FIG. 9, the MCU 23 functionally includes a profile data specifying unit 40, an output data obtaining unit 41, and a profile data storage unit 42. Of the profile data specifying unit 40, the output data obtaining unit 41, and the profile data storage unit 42, the profile data storage unit 42 is implemented within the memory 23a shown in FIG. 2.

The profile data storage unit 42 stores a plurality of pieces of profile data in advance. The plurality of pieces of profile data represent composite functions $f_1^{-1} \bigcirc h$ different from each other. The profile data may be stored into the profile data storage unit 42 at a factory when the stylus 2 is manufactured, or may be stored into the profile data storage unit 42 by the user or automatic processing as appropriate. In the case where the profile data is stored into the profile data storage unit 42 by the user or automatic processing, the profile data may be supplied from the sensor controller 31 to the stylus 2 by using the uplink signal US. Alternatively, a wireless communication function of, for example, Bluetooth®, a wireless local area network (LAN), or the like may be provided to the stylus 2 so that the profile data is supplied from an external computer to the stylus 2 through the wireless communication function.

FIG. 10 is a diagram showing an example of the profile data stored in the profile data storage unit 42. As shown in the figure, the profile data is stored in the profile data storage unit 42 in the form of look-up tables. More specifically, the profile data storage unit 42 stores a series of data representing the relation between the primary pen pressure value $P_1$ and the output value $P_O$ for each of arbitrary combinations of types of core bodies 10 (hard plastic for imitating a pencil, a brush for providing a softer touch than a pencil, and the like) and types of pressure sensors 21 (a variable capacitance capacitor, a strain gage, and the like) for respective pieces of setting information (N pieces of setting information 1 to N are illustrated in FIG. 10). This series of data is specifically formed by output values $P_O$ corresponding to a plurality of respective primary pen pressure values $P_1$ set in advance (leftmost column in FIG. 10), and each piece of the series of data constitutes one piece of profile data.

Returning to FIG. 9, the profile data specifying unit 40 is externally supplied with the setting information, and obtains the characteristic information representing the characteristic of the pen pressure detecting portion PD by detecting the type of the pen pressure detecting portion PD. In the example of FIG. 10, the setting information is information specifying one of the N pieces of setting information 1 to N. The profile data specifying unit 40 specifies one of the plurality of pieces of profile data stored in the profile data storage unit 42 on the basis of the obtained setting information and the obtained characteristic information, and notifies the output data obtaining unit 41 of the specified type of the profile data. The output data obtaining unit 41 sets the profile data by selecting one piece of profile data from the profile data storage unit 42 on the basis of the thus notified profile data type, and performs processing of transforming the primary pen pressure value $P_1$ into the output value $P_O$ on the basis of the set profile data.

More specifically, referring to FIG. 10, in a case where for example the setting information is information specifying the setting information 1 and the pen pressure detecting portion PD is formed of the pressure sensor 21 as a variable capacitance capacitor and the core body 10 as a hard plastic, the profile data specifying unit 40 specifies profile data included in a box PE in FIG. 10. As a result, the output data obtaining unit 41 outputs 706.6 as the output value $P_O$ when the primary pen pressure value $P_1$ is 120.0, for example, and outputs 865.9 as the output value $P_O$ when the primary pen pressure value $P_1$ is 150.0. When a value as the primary pen pressure value $P_1$ is not explicitly shown in the profile data, the output data obtaining unit 41 may obtain the output value $P_O$ by interpolation. Specifically, an arbitrary interpolation curve may be generated from the values explicitly shown in the profile data and the output value $P_O$ may be obtained on the basis of the interpolation curve, or the output value $P_O$ may be obtained by a simple linear interpolation.

As described above, according to the present embodiment, the output value $P_O$ is obtained from the primary pen pressure value $P_1$ on the basis of the profile data representing the correspondence relation between the primary pen pressure value $P_1$ and the output value $P_O$, wherein the profile data is determined on the basis of the setting information and the characteristic information. Thus, the relation between the force $F_{org}$ applied to the core body 10 and the output value $P_O$ of the stylus 2 can be isolated (decoupled) from the specific configuration of the pen pressure detecting portion PD (for example, regardless of whether the pressure sensor 21 is a capacitance switch or a strain gage). That is, the relation between the force $F_{org}$ applied to the core body and the output value $P_O$ of the stylus 2 can be fixed (standardized) irrespective of the configuration of the pen pressure detecting portion PD of the stylus 2.

Considered from another viewpoint, according to the present embodiment, the relation between the force $F_{org}$ applied to the core body 10 and the output value $P_O$ of the stylus 2 can be controlled arbitrarily without depending on the specific configuration of the pen pressure detecting portion PD. For example, when the same setting information is set in a plurality of styluses 2 whose pen pressure detecting portions PD have different configurations, the same output value $P_O$ can be output for the same force $F_{org}$ even though the configurations of the pen pressure detecting portions PD are different from each other. Conversely, when different setting information is set in a plurality of styluses 2 whose pen pressure detecting portions PD have the same configuration, different output values $P_O$ can be output for the same force $F_{org}$ even though the pen pressure detecting portions PD have the same configuration.

In addition, according to the present embodiment, the profile data can be stored in advance in the form of functions for arithmetic operation or in the form of look-up tables in the memory 23a of the stylus 2. Further, the setting information can be externally set to the stylus 2, while the stylus 2 can be made to obtain the characteristic information autonomously.

In addition, in the case where the primary pen pressure value $P_1$ is directly transformed into the output value $P_O$ by using a composite function as shown in FIG. 7 and FIG. 8, an arithmetic load on the MCU 23 of the stylus 2 can be reduced as compared with the case where the primary pen pressure value $P_1$ is first returned to the force $F_{org}$ and then converted to the output value $P_O$, as shown in FIG. 5 and FIG. 6. In addition, by using look-up tables, it is possible to simplify the arithmetic processing of the MCU 23, and use a relation which would be otherwise difficult to express in the form of a simple function.

In addition, because a nonvolatile memory is used as the memory 23a, the profile data already stored in the memory 23a can be maintained even when power to the stylus 2 is turned off.

In addition, as shown in FIG. 10, when pieces of profile data (or sets of profile data) different from each other are prepared for the respective pieces of setting information 1 to N (force response curves 1 to N), it is possible to set, in the stylus, setting information (force response curves) based on arbitrary information (external information) not depending on the configuration of the pen pressure detecting portion PD of the stylus 2 (which is a combination of the pressure sensor 21 and the core body 10).

Figure 28A:
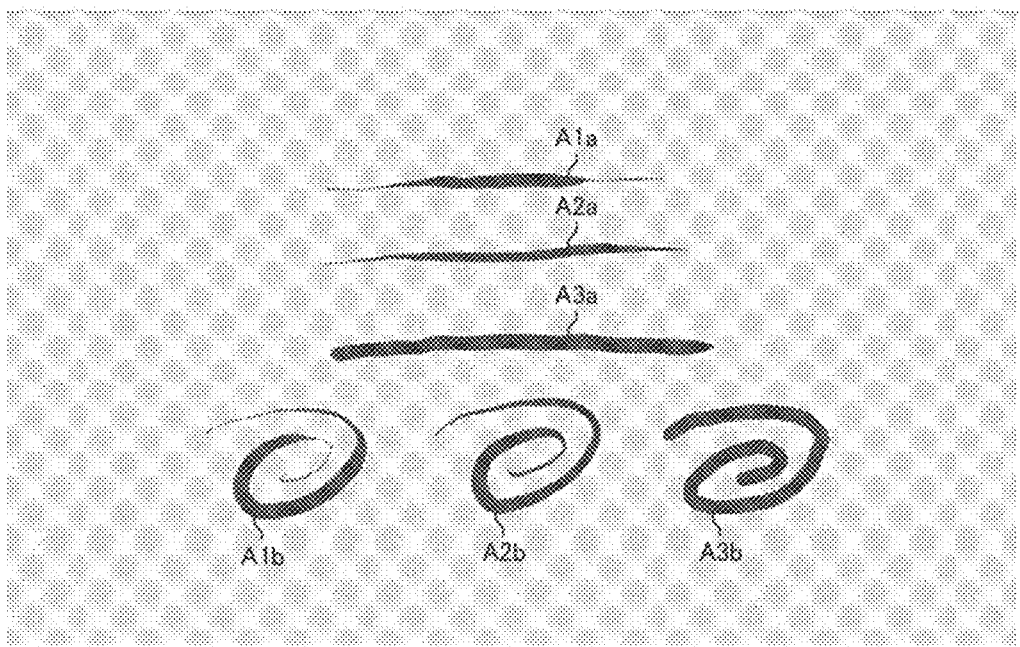
Figure 28B:
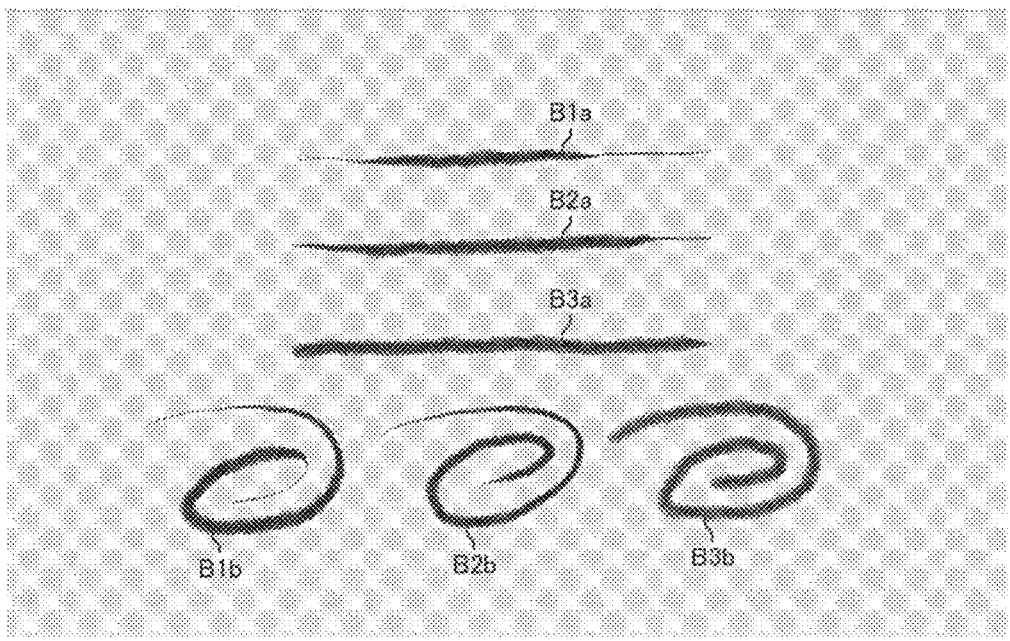

(1) For example, profile data (or a set of profile data) for setting the stylus 2 as an ink pen as shown in FIG. 28A to be described later (ink pen having a first line width) may be prepared for the setting information 1. Profile data for setting the stylus 2 as an ink pen having a second line width different from the first line width is prepared for the setting information 2. Profile data for setting the stylus 2 as a pencil (lead pencil) as shown in FIG. 28B to be described later (lead pencil having a core of first hardness) may be prepared for the setting information N−1. Profile data for setting the stylus 2 as a pencil (lead pencil) having a core of second hardness different from the first hardness may be prepared for the setting information N. When any of these pieces of profile data is selectively used, the stylus 2 having the same hardware can be made to output an output value (for example an ink parameter such as line width, opacity, or the like) corresponding to a force response curve imitating an arbitrarily selected one of writing tools.

(2) In addition, for example, a cloud server (see FIG. 29 to be described later) is made to retain the setting information 1 (force response curve) and the setting information 2 (force response curve) respectively representing relations between the force and an ink parameter (line width or opacity). For example, the relation represented by the setting information 1 imitates a writing feeling of a first type of fountain pen manufactured by an existing first fountain pen manufacturer, and the relation represented by the setting information 2 imitates a writing feeling of a second type of fountain pen manufactured by a second fountain pen manufacturer. Selecting one of these pieces of setting information and setting the setting information as a part of profile data in the stylus 2 makes the stylus 2 capable of outputting an output value imitating the first type of fountain pen or the second type of fountain pen.

(3) In addition, when the pieces of setting information 1 to N are information different for respective IDs unique to styluses 2 (or for respective accounts of users associated with the unique IDs), styluses 2 that realize arbitrary force response curves (i.e., relations between the force $F_{org}$ and the ink parameter (line width or opacity) or the like) according to the users holding the styluses 2 can be obtained. This makes it possible to avoid having the difference between manners in which the users hold the styluses 2 (e.g., vertically or obliquely) influence the ink parameter.

An example of concrete structures of the stylus 2 will be described in more detail in the following with reference to FIGS. 11 to 23.

<Pen Pressure Detecting Portion (Force Transmitting Mechanism)>

FIG. 11A is a sectional view of the core body holder 20 shown in FIG. 2. FIG. 11B is a diagram of the core body holder 20 including additional elements fixed thereto. As shown in FIG. 11A, the core body holder 20 is a substantially cylindrical member, and includes a hollow portion 20a having an opening at the tip of the stylus 2 and a projecting portion 20b disposed on the inner surface of the hollow portion 20a. As described above, the hollow portion 20a is a space for housing the core body 10, and the projecting portion 20b engages with the recessed portion 10a of the core body 10.

As shown in FIG. 11B, the core body holder 20 is provided with a pressure sensor 21, an MCU 23, and one or more terminals 24. The pressure sensor 21 is disposed at the deepest part of the hollow portion 20a. The pressure sensor 21 is electrically connected to the MCU 23. The one or more terminals 24 are arranged at a top surface of the projecting portion 20b. The one or more terminals 24 are also electrically connected to the MCU 23.

FIG. 12A is a sectional view of the core body 10 shown in FIG. 2. FIG. 12B is a diagram of the core body 10 including additional elements fixed thereto. As shown in FIG. 12A, the core body 10 is a substantially cylindrical member, and includes a recessed portion 10a near its center in a longitudinal direction of the core body 10. The projecting portion 20b of the core body holder 20 is configured to engage with the recessed portion 10a of the core body 10.

As shown in FIG. 12B, the core body 10 is provided with an electrode 11 and one or more terminals 12. The electrode 11 is embedded in the vicinity of one (distal) end portion of the core body 10 constituting a pen tip. The one or more terminals 12 are disposed at a position corresponding to the side surface of the recessed portion 10a. The electrode 11 is electrically connected to the one or more terminals 12 by wiring embedded in the core body 10.

Many variations are conceivable for the configuration of the core body 10. FIGS. 13A-13C show three variations of the core body 10. FIG. 13A is a diagram showing a core body 10A according to a first variation of the core body 10. FIG. 13B is a diagram showing a core body 10B according to a second variation of the core body 10. FIG. 13C is a diagram showing a core body 10C according to a third variation of the core body 10. FIG. 13D is a sectional view of the core body 10A cut across line B-B of FIG. 13A. FIG. 13E is a sectional view of the core body 10B cut across line C-C of FIG. 13B. FIG. 13F is a sectional view of the core body 10C cut across line D-D of FIG. 13C.

The configuration of the core body 10A is the same as that shown in FIG. 12. The core body 10A has a substantially circular cross section. Three projecting portions are formed on a side surface of the recessed portion 10a of the core body 10A. As shown in FIG. 13D, when an upper side of the drawing is set as a 12 o'clock position, the three projecting portions are respectively arranged at the 12 o'clock position, a 3 o'clock position, and a 6 o'clock position. The core body 10A has two terminals 12 connected to each other by wiring L1. The two terminals 12 are formed at surfaces of the projecting portions respectively arranged at the 3 o'clock position and the 6 o'clock position.

The core body 10B is formed by adding adjusting portions 13 shown in FIG. 13B to the configuration of the core body 10A. The adjusting portions 13 are elastic members erected on an inner lower surface (i.e., the surface on the pen tip side) of the recessed portion 10a. The adjusting portions 13 play a role of distributing a part of the force $F_{org}$ to the core body holder 20. The role of the adjusting portions 13 will be described later in more detail with reference to FIG. 17. The core body 10B has two terminals 12 connected to each other by wiring L2. These terminals 12 are formed at surfaces of the projecting portions respectively arranged at the 12 o'clock position and the 3 o'clock position described above.

The core body 10C is formed by adding an adjusting portion 14 shown in FIG. 13C to the configuration of the core body 10A. The adjusting portion 14 is an elastic member bonded to one (distal) end portion of the core body 10C. The adjusting portion 14 covers the one (distal) end portion of the core body 10C, and constitutes the pen tip of the stylus 2. The adjusting portion 14 also plays a role of distributing a part of the force $F_{org}$ to the core body holder 20. The role of the adjusting portion 14 will be described later in more detail with reference to FIG. 18 and FIG. 19. The core body 10B has three terminals 12 connected to each other by wiring L3. These terminals 12 are formed at surfaces of the projecting portions individually arranged at the 12 o'clock position, the 3 o'clock position, and the 6 o'clock position described above.

The MCU 23 of the stylus 2 is configured to be able to determine the type of the inserted core body 10 by detecting a contact state between each terminal 12 in the recessed portion 10a of the core body 10 and the plurality of terminals 24 arranged on the projecting portion 20a of the core body holder 20. In the following, a cross-sectional structure of the core body holder 20 will be described with reference to FIG. 14, and thereafter concrete details of the above determination will be described.

Figure 14:
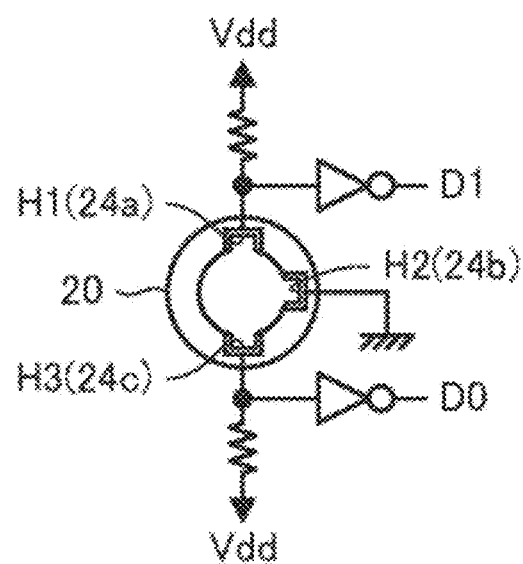
FIG. 14 is a sectional view of the core body holder 20 cut across line A-A of FIG. 11B.

FIG. 14 is a cross-sectional view of the projecting portion 20a of the core body holder 20 cut across line A-A of FIG. 11B. As shown in the figure, the projecting portion 20a of the core body holder 20 has a substantially circular cross section having three recessed portions H1 to H3 in a side surface. The recessed portions H1 to H3 are arranged in order from the recessed portion H1 so as to be spaced apart from each other by 90 degrees. The terminals 24 are formed on respective inner surfaces of the recessed portions H1 to H3. In the following, the terminals 24 formed on the inner surfaces of the recessed portions H1 to H3 will be referred to as terminals 24a to 24c, respectively. The terminal 24a is connected via an inverter to a terminal D1 of the MCU 23, which is also shown in FIG. 11B. The terminal 24b is grounded. The terminal 24c is connected via an inverter to a terminal D0 of the MCU 23, which is also shown in FIG. 11B. The terminals 24a and 24c are each also connected via a resistive element to a power supply wiring supplied with a power supply potential Vdd.

The recessed portions H1 to H3 are configured to be fitted with the three projecting portions provided on the recessed portion 10a of each of the core bodies 10A to 10C.

When the core body 10A is inserted into the core body holder 20, the two projecting portions having the terminals 12 among the three projecting portions provided on the recessed portion 10a of the core body 10A are fitted into the respective recessed portions H2 and H3 provided on the projecting portion 20a of the core body holder 20. As a result, the terminals 24b and 24c are interconnected via the wiring L1 (see FIG. 13D). Thus, the terminal 24c is grounded, and a high level (1) appears at the terminal D0. Meanwhile, the projecting portion having no terminal 12 is fitted into the recessed portion H1. As a result, the terminal 24a is set in a floating state. Thus, a low level (0) appears at the terminal D1. The MCU 23 detects that the inserted core body 10 is the core body 10A from the potential levels "0" and "1" thus supplied to the terminals D1 and D0.

When the core body 10B is inserted into the core body holder 20, the two projecting portions having the terminals 12 among the three projecting portions provided on the recessed portion 10a of the core body 10B are fitted into the respective recessed portions H1 and H2 provided on the projecting portion 20a of the core body holder 20. As a result, the terminals 24a and 24b are interconnected via the wiring L2 (see FIG. 13E). Thus, the terminal 24a is grounded, and a high level (1) appears at the terminal D1. Meanwhile, the projecting portion having no terminal 12 is fitted into the recessed portion H3. As a result, the terminal 24c is set in a floating state. Thus, a low level (0) appears at the terminal D0. The MCU 23 detects that the inserted core body 10 is the core body 10B from the potential levels "1" and "0" thus supplied to the terminals D1 and D0.

When the core body 10C is inserted into the core body holder 20, the projecting portions having the terminals 12 on the recessed portion 10a of the core body 10C are fitted into all of the recessed portions H1 to H3 provided on the projecting portion 20a of the core body holder 20. As a result, the terminals 24a to 24c are interconnected via the wiring L3 (see FIG. 13F). Thus, the terminals 24a and 24c are both grounded, and a high level (1) appears at both of the terminals D1 and D0. The MCU 23 detects that the inserted core body 10 is the core body 10C from the potential levels "1" and "1" thus supplied to the terminals D1 and D0.

As described above, the MCU 23 is configured to determine the type of the core body 10 on the basis of the potential levels supplied to the terminals D1 and D0.

Description will next be made of a relation between the force $F_{org}$ and the force $F_{trans}$ in the case of each of the three types of core bodies 10A to 10C shown in FIGS. 13A-13C. As described above, the force $F_{trans}$ and the force $F_{org}$ are not necessarily the same, but may be different from each other. The following description will be made of concrete examples of the respective cases.

Figure 15A:
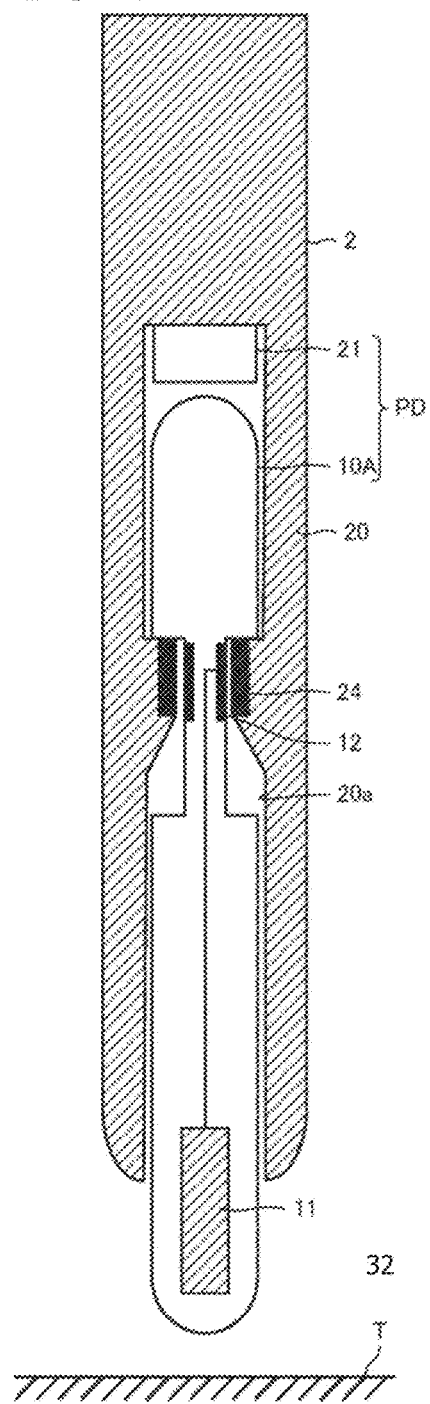
Figure 15B:
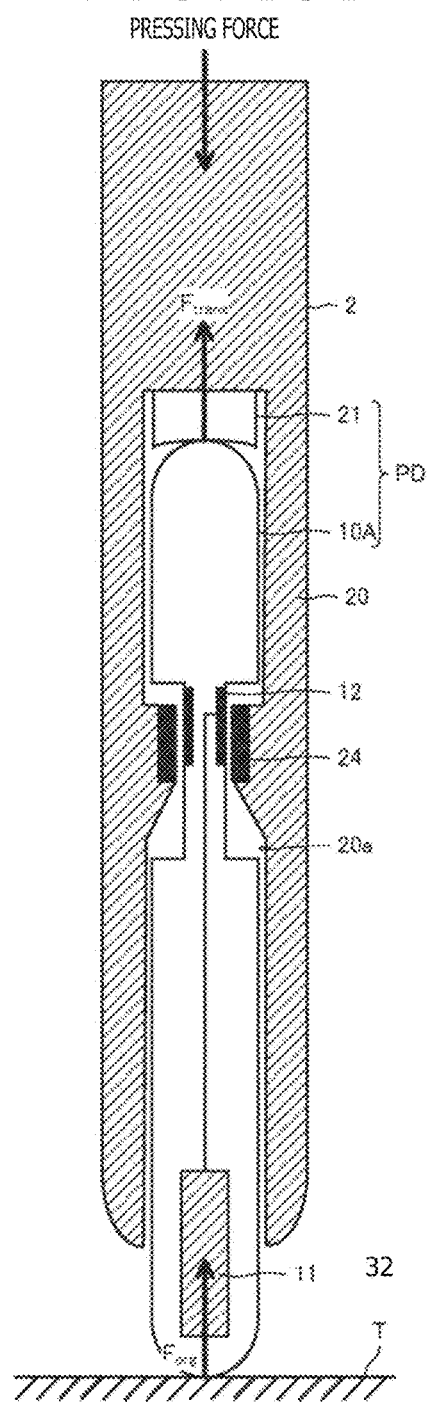
Figure 16:
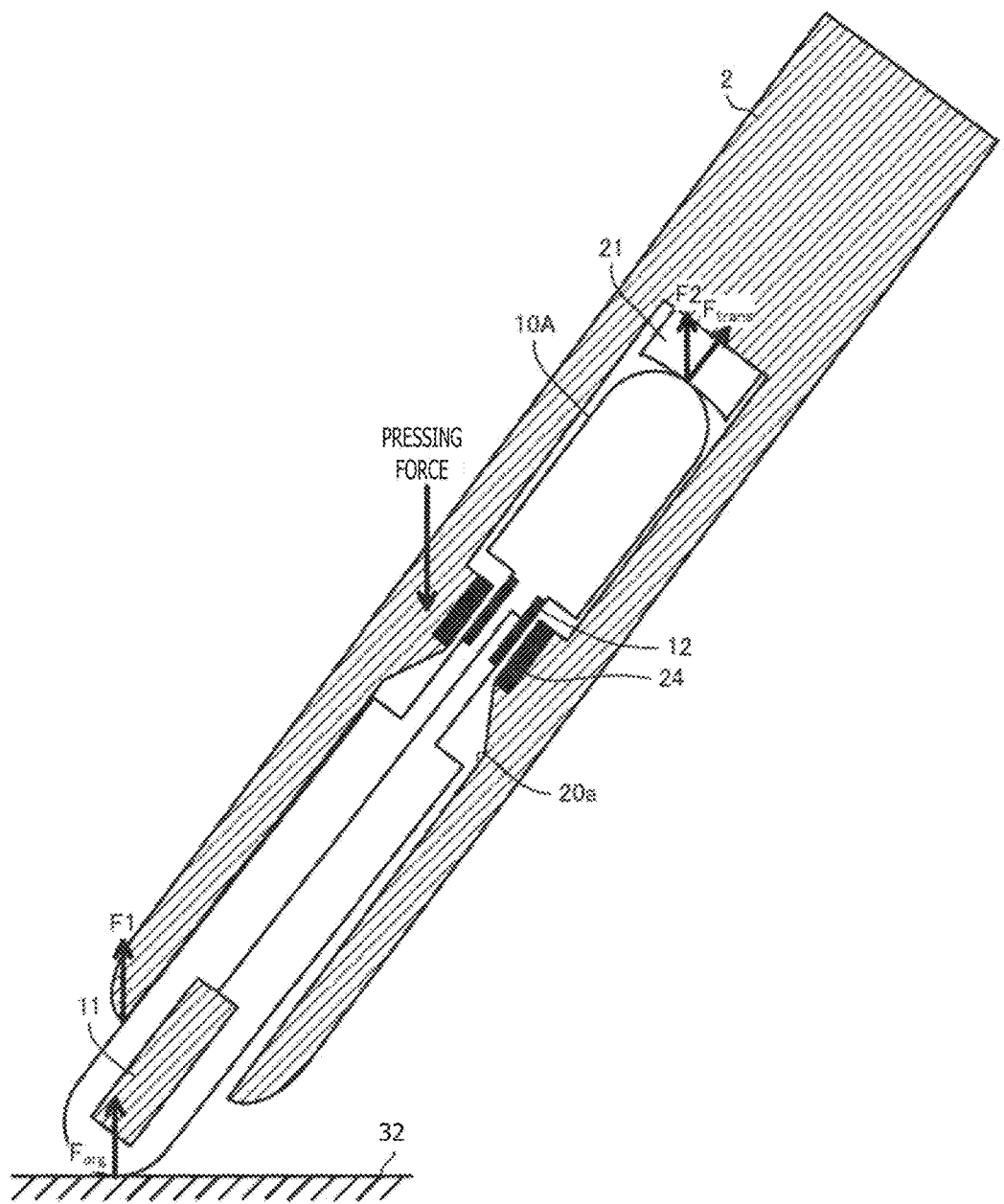
FIG. 16 is a diagram showing a usage state of the stylus 2 having the core body 10A (in a state in which the pen tip is obliquely in contact with the panel surface 32).

FIG. 15 and FIG. 16 are diagrams showing usage states of the stylus 2 having the core body 10A. FIG. 15A shows a state in which the pen tip is not in contact with the panel surface 32. FIG. 15B shows a state in which the pen tip is perpendicularly in contact with the panel surface 32. FIG. 16 shows a state in which the pen tip is obliquely in contact with the panel surface 32.

As shown in FIG. 15A, in the state in which the pen tip is not in contact with the panel surface 32, no force $F_{org}$ is applied from the panel surface 32 to the one (distal) end portion of the core body 10A. As a result, no force $F_{trans}$ is applied to the pressure sensor 21. On the other hand, as shown in FIG. 15B, in the state in which the pen tip is perpendicularly in contact with the panel surface 32, a force $F_{org}$ is applied from the panel surface 32 to the core body 10A, and all of the force $F_{org}$ is transmitted to the pressure sensor 21 through the core body 10A. Hence, the magnitude of the force $F_{trans}$ applied to the pressure sensor 21 is equal to the magnitude of the force $F_{org}$.

In the state in which the pen tip is obliquely in contact with the panel surface 32, a force $F_{org}$ is obliquely applied to the core body 10A. Therefore, as shown in FIG. 16, a part of the side surface of the core body 10A comes into contact with the inner surface of the hollow portion 20a of the core body holder 20. As a result, a part of a force $F_{org}$ (force F1 shown in the figure) is absorbed by the core body holder 20. In addition, a force applied from the core body 10A to the pressure sensor 21 includes a component applied perpendicularly to the pressure detecting surface and a component (force F2 shown in the figure) applied obliquely to the pressure detecting surface. The pressure sensor 21 is configured to be able to detect, as the force $F_{trans}$, only the force applied perpendicularly to the pressure detecting surface. Thus, as a result of the above, the detected (transmitted) force $F_{trans}$ is smaller than the original force $F_{org}$ by F1+F2, that is, $F_{trans}=F_{org}-F1-F2$.

In place of the pressure sensor configured to be able to detect only a force applied perpendicularly to the pressure detecting surface as the force $F_{trans}$ as described above, other types of the pressure sensor 21 can also be used. For example, in a case where a pressure sensor 21 is used which is configured to be able to detect forces applied in an X-direction $F_{transX}$, a Y-direction $F_{transY}$, and a circumferential direction $F_{transR}$ in addition to a force $F_{transZ}$ in an axial direction (Z-direction), profile data can be defined for the respective components. That is, profile data Z, profile data X and Y, and profile data R can be defined.

Figure 17A:
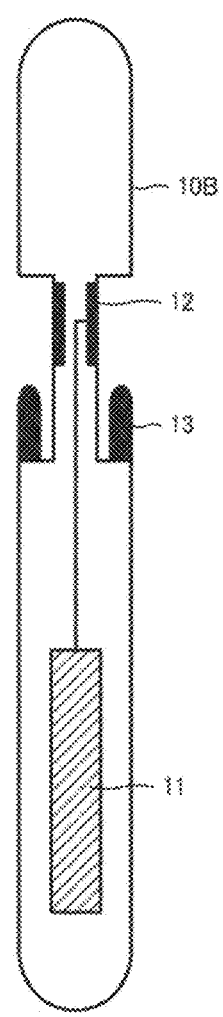
FIG. 17A is a sectional view of the core body 10B shown also in FIG. 13B.
Figure 17B:
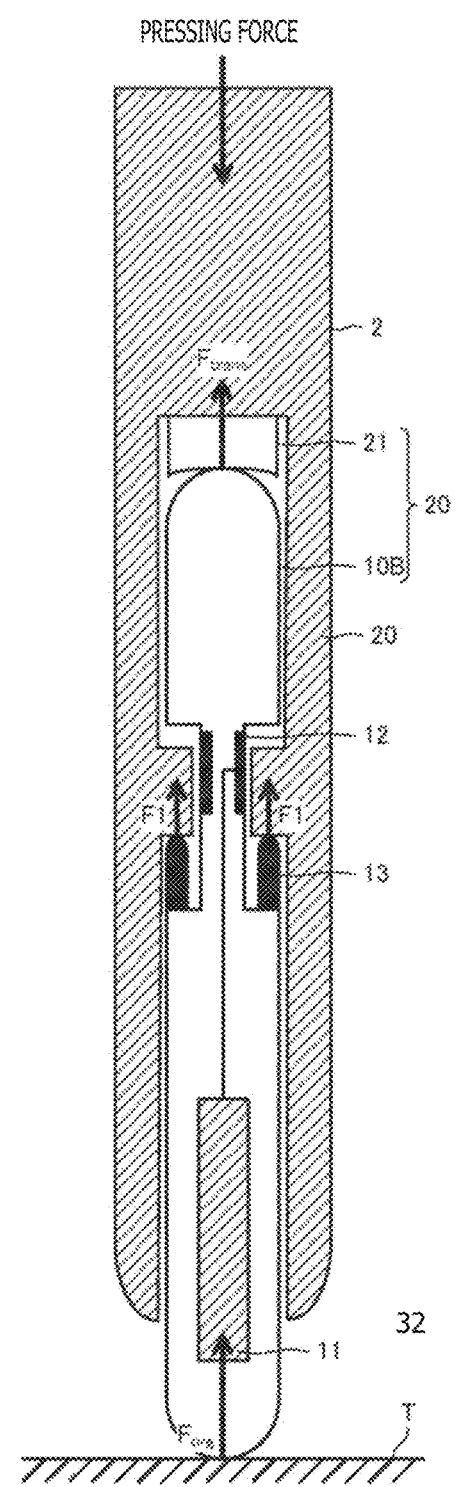
FIG. 17B is a diagram showing a usage state of the stylus 2 having the core body 10B (in a state in which a pen tip is perpendicularly in contact with the panel surface 32).

FIG. 17A is a cross-sectional view of the core body 10B shown also in FIG. 13B. FIG. 17B is a diagram showing a usage state of the stylus 2 having the core body 10B (in a state in which the pen tip is perpendicularly in contact with the panel surface 32).

As shown in FIG. 17B, in the case of the core body 10B, the adjusting portions 13 are in contact with the core body holder 20 in the perpendicular direction. Thus, even in the state in which the pen tip is perpendicularly in contact with the panel surface 32, a part of a force $F_{org}$ (forces F1 shown in the figure) is absorbed by the core body holder 20. Hence, the force $F_{trans}$ is smaller than the force $F_{org}$ by F1, that is, $F_{trans}=F_{org}-F1$.

Figure 18A:
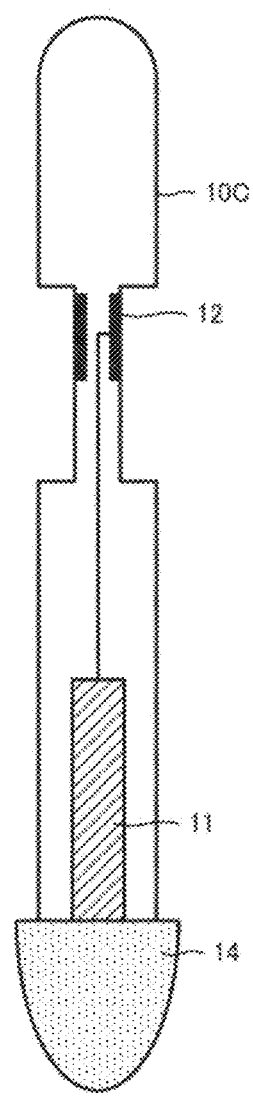
FIG. 18A is a sectional view of the core body 10C shown also in FIG. 13C.
Figure 18B:
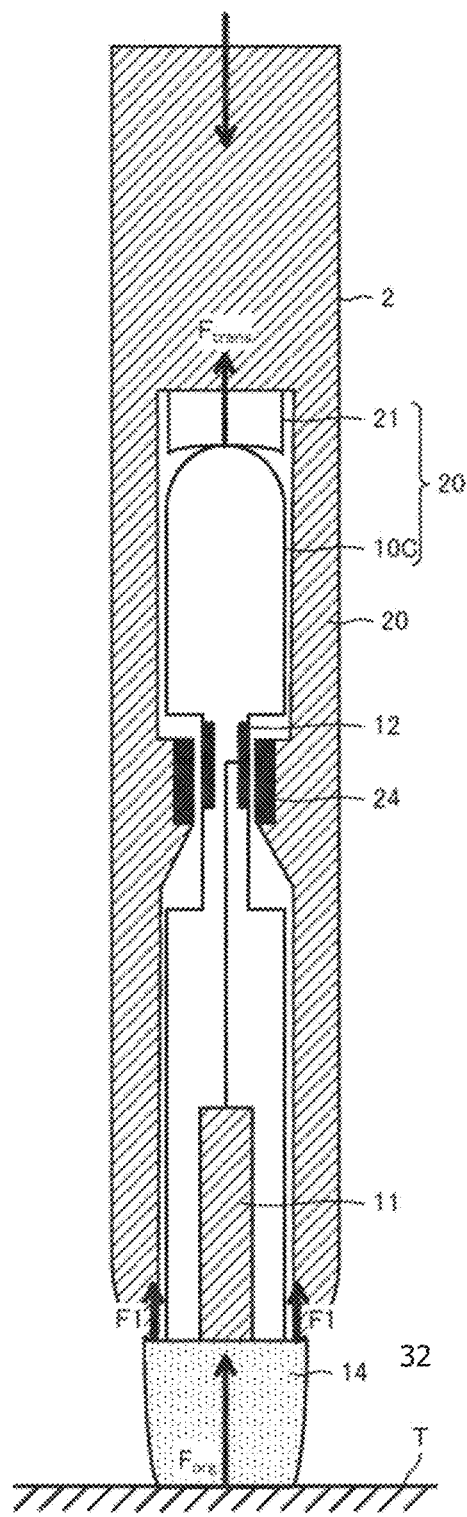
FIG. 18B is a diagram showing a usage state of the stylus 2 having the core body 10C (in a state in which a pen tip is perpendicularly in contact with the panel surface 32).
Figure 19:
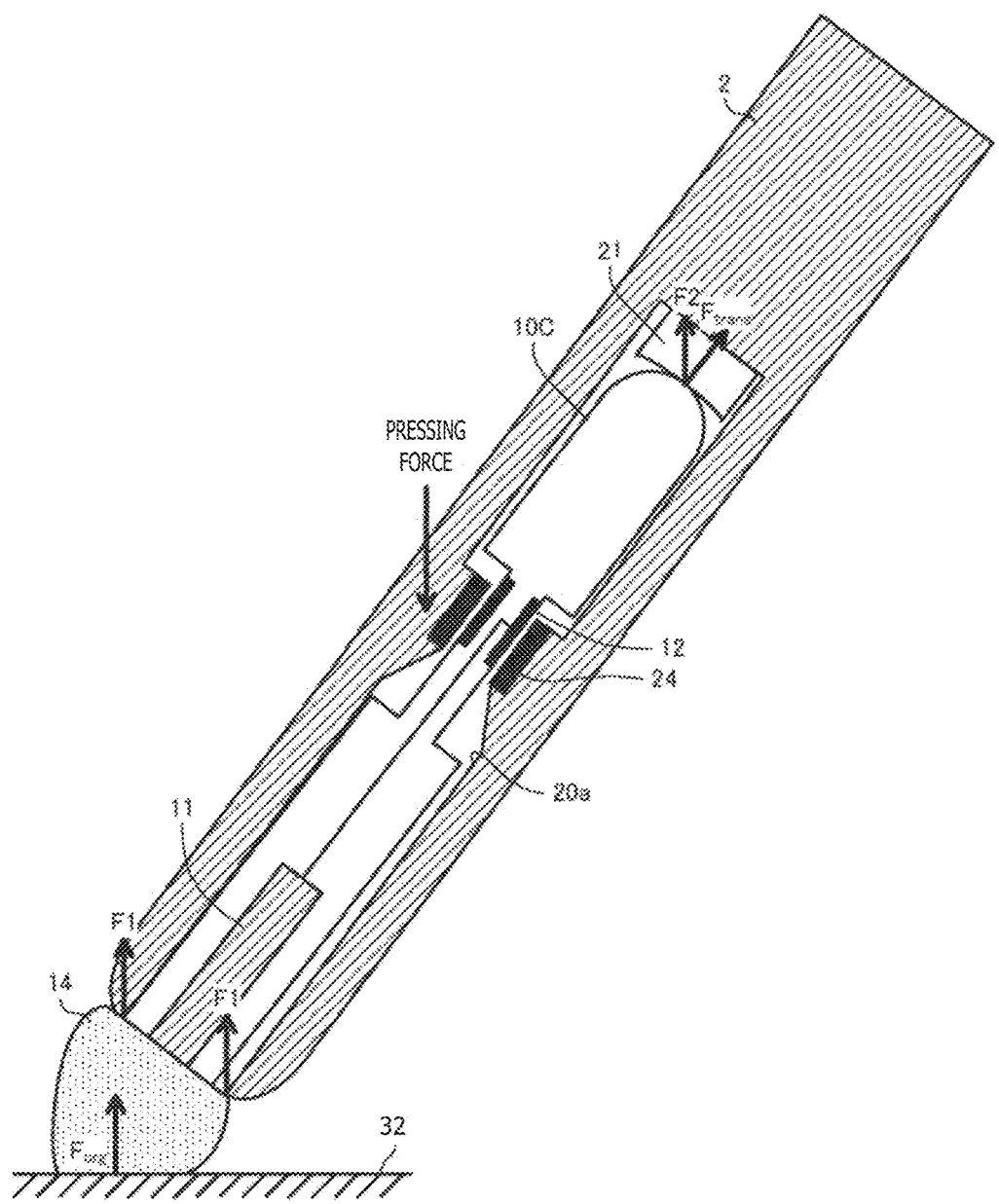
FIG. 19 is a diagram showing a usage state of the stylus 2 having the core body 10C (in a state in which the pen tip is obliquely in contact with the panel surface 32).

FIG. 18A is a cross-sectional view of the core body 10C shown also in FIG. 13C. FIG. 18B and FIG. 19 are diagrams showing usage states of the stylus 2 having the core body 10C. FIG. 18B shows a state in which the pen tip is perpendicularly in contact with the panel surface 32. FIG. 19 shows a state in which the pen tip is obliquely in contact with the panel surface 32.

As shown in FIG. 18B, also in the case of the core body 10C, as in the case of the core body 10B, the adjusting portion 14 is in contact with the core body holder 20 in the perpendicular direction. Even in the state in which the pen tip is perpendicularly in contact with the panel surface 32, a part of a force $F_{org}$ (forces F1 shown in the figure) is absorbed by the core body holder 20. Hence, the force $F_{trans}$ is smaller than the force $F_{org}$ by F1, that is, $F_{trans}=F_{org}-F1$.

In addition, because the adjusting portion 14 is in contact with the tip of the core body holder 20, also in the state in which the pen tip is obliquely in contact with the panel surface 32 as shown in FIG. 19, a part of a force $F_{org}$ (forces F1 shown in the figure) is absorbed by the core body holder 20 via the adjusting portion 14. In addition, in this state, as in the case of the core body 10A shown in FIG. 16, a force applied from the core body 10C to the pressure sensor 21 includes a component applied perpendicularly to the pressure detecting surface and a component (force F2 shown in the figure) applied obliquely to the pressure detecting surface. As a result, the force $F_{trans}$ is smaller than the force $F_{org}$ by F1+F2, that is, $F_{trans}=F_{org}-F1-F2$.

As described above, the force $F_{trans}$ and the force $F_{org}$ are not necessarily the same, but may be values different from each other depending on the type of the core body 10, a manner in which the user uses the stylus 2 (perpendicularly or obliquely). According to the present embodiment, the processing of the MCU 23 can absorb this difference from the host controller 4. Specifically, the difference in the correspondence relation between the force $F_{trans}$ and the force $F_{org}$ due to the type of the core body 10 or the tendency of the user can be absorbed (or hidden) by preparing profile data differing according to the type of the core body 10, the user, the pen ID, or the like.

It is to be noted that concrete examples of configuration of the core body 10 are not limited to the core bodies 10A to 10C shown thus far.

Figure 20:
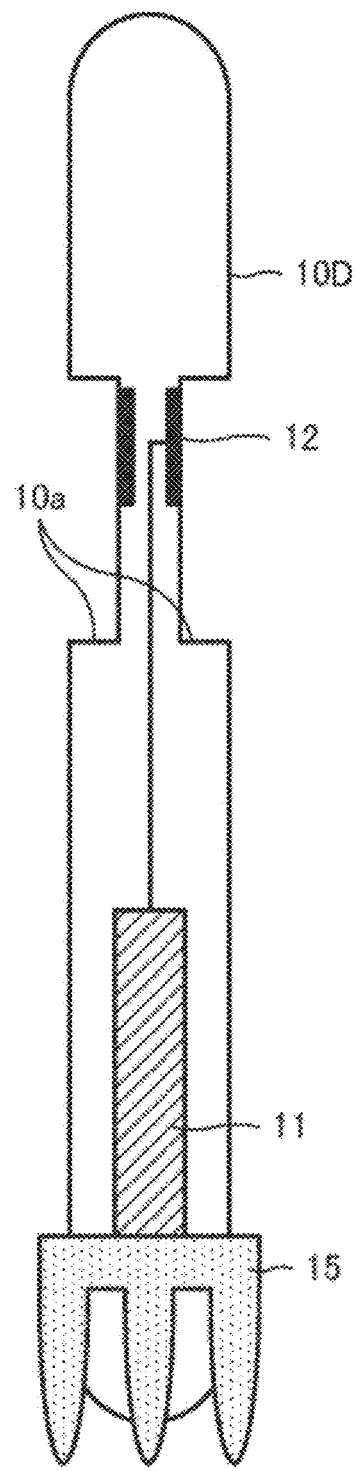
FIG. 20 is a diagram showing a core body 10D according to a fourth variation of the core body 10.

For example, FIG. 20 is a diagram showing a core body 10D according to a fourth variation of the core body 10. The core body 10D is formed by replacing the adjusting portion 14 of the core body 10C shown in FIG. 13C with an adjusting portion 15 having the shape of a paint brush or a hair brush. The adjusting portion 15 may be formed of material similar to a paint brush material, or may be formed of an elastic material of silicon or the like. Also in the case of the core body 10D, as in the case of the core body 10C, there are cases where the force $F_{trans}$ and the force $F_{org}$ are not equal to each other.

<Pen Pressure Detecting Portion (Pressure Sensor)>

Different types of the pressure sensor 21 will next be described. Variations are also conceivable for the configuration of the pressure sensor 21. The following description will be made by citing an example of three variations.

Figure 21:
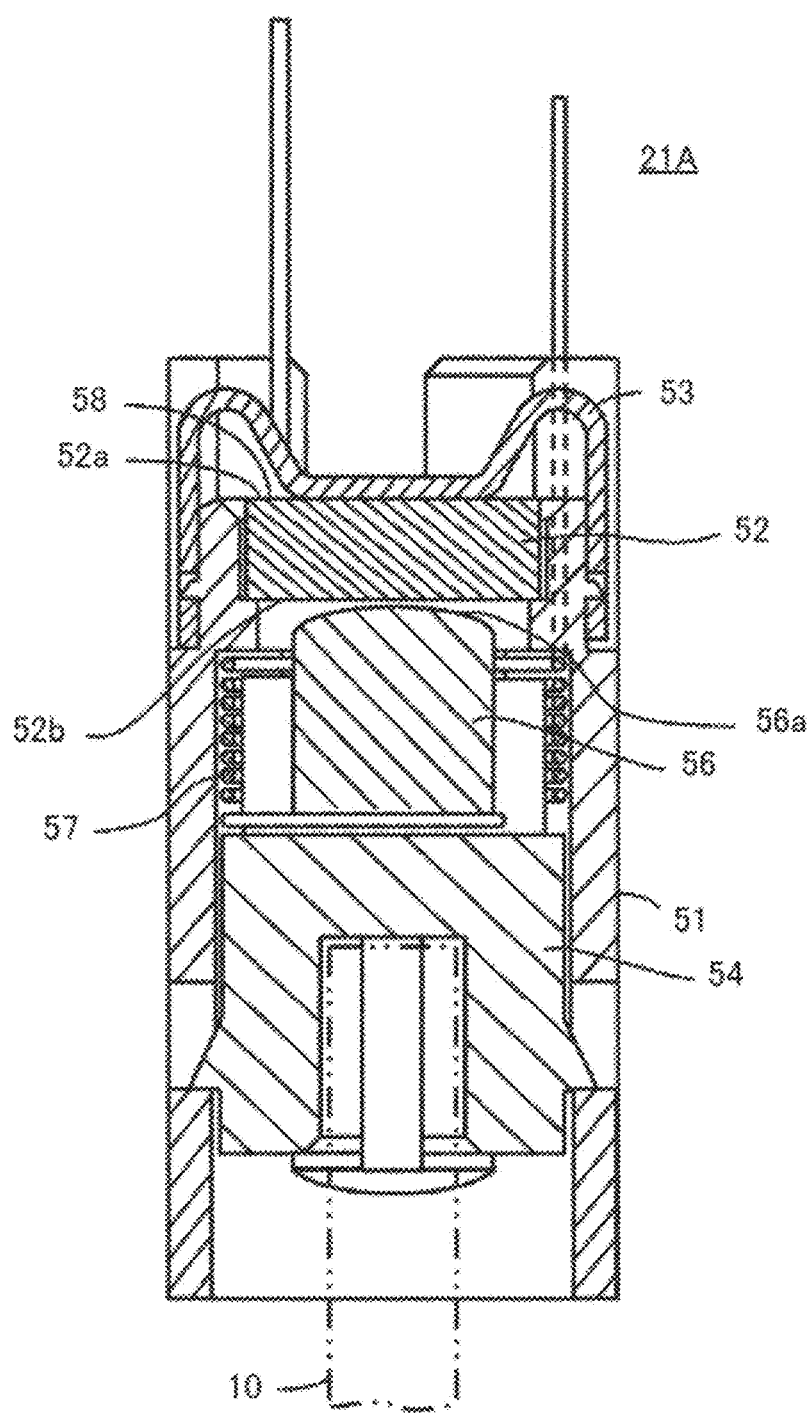
FIG. 21 is a diagram showing a pressure sensor 21A according to a first variation of the pressure sensor 21.

FIG. 21 is a diagram showing a pressure sensor 21A according to a first variation of the pressure sensor 21. The figure is a cross-sectional view of the pressure sensor 21A. The pressure sensor 21A is a type of sensor using a variable capacitance capacitor (capacitance switch). The pressure sensor 21A includes a dielectric 52, a terminal member 53 biasing the dielectric 52, a conductive member 56, and an elastic member 57. The dielectric 52 is formed, for example in a substantially disk shape. The dielectric 52 has a first face portion 52a and a second face portion 52b facing the first face portion 52a substantially in parallel with the first face portion 52a. A first electrode portion 58 constituting one electrode of the variable capacitance capacitor is affixed to the first face portion 52a. The conductive member 56 has a curved surface portion 56a, which faces the second face portion 52b of the dielectric 52, at one end in an axial direction of the conductive member 56. The curved surface portion 56a constitutes a second electrode portion, which is another electrode of the variable capacitance capacitor.

As shown in FIG. 21, when the above-described force $F_{org}$ (see FIG. 2) is applied to the one end portion of the core body 10, a retaining member 54 of the variable capacitance capacitor is pressed by the force $F_{trans}$ transmitted to the pressure sensor 21A via the core body 10. The retaining member 54 thereby moves toward one end in an axial direction of a housing 51. The curved surface portion 56a of the conductive member 56 then comes into contact with the second face portion 52b of the dielectric 52. When the force $F_{trans}$ is increased, the conductive member 56 is deformed (flattened) by being pressed by the second face portion 52b of the dielectric 52. As a result, an area of contact between the conductive member 56 and the second face portion 52b changes. The capacitance value of the dielectric 52 thereby changes. The pressure sensor 21A converts this change into a digital value, and outputs the digital value as the above-described primary pen pressure value $P_1$ to the MCU 23.

There are various concrete methods conceivable for the generation of the primary pen pressure value $P_1$ by the pressure sensor 21A. To cite an example, a time constant circuit can be formed, which outputs a signal corresponding to a time constant that changes according to a capacitance value between the terminal member 53 and the elastic member 57, and the value of this signal can be used as the primary pen pressure value $P_1$.

Figure 22:
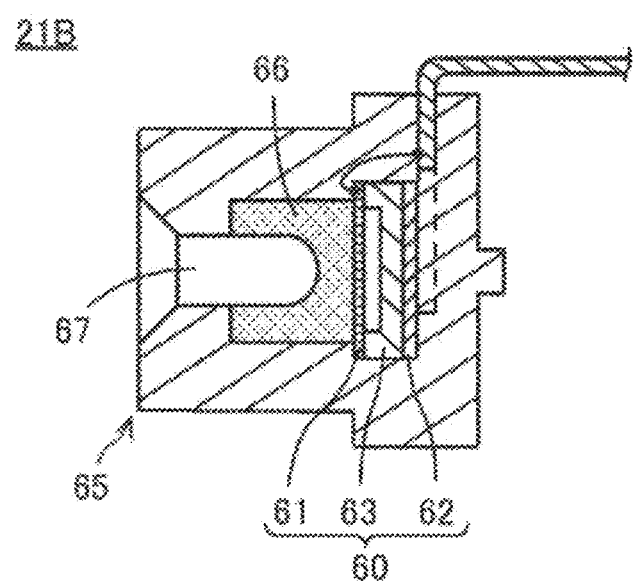
FIG. 22 is a diagram showing a pressure sensor 21B according to a second variation of the pressure sensor 21.

FIG. 22 is a diagram showing a pressure sensor 21B according to a second variation of the pressure sensor 21. The figure is a cross-sectional view of the pressure sensor 21B. The pressure sensor 21B is also a type of sensor using a variable capacitance capacitor (capacitance switch). However, the pressure sensor 21B has a configuration different from that of the pressure sensor 21A. Specifically, the pressure sensor 21B has a configuration obtained by sealing a pressure sensing chip 60 formed as a semiconductor device fabricated by micro electro mechanical system (MEMS) technology within, for example, a cubic or rectangular parallelepipedic box type package 65. The pressure sensing chip 60 detects an applied pressure as a change in capacitance.

When the other end portion of the core body 10 is inserted into a communicating hole 67 of the pressure sensor 21B, an elastic member 66 elastically receives the core body 10. Thus, the capacitance of the pressure sensing chip 60 is a value corresponding to the force $F_{trans}$ applied from the core body 10 to the pressure sensor 21B, so that the pressure sensor 21B can generate the primary pen pressure value $P_1$.

Figure 23:
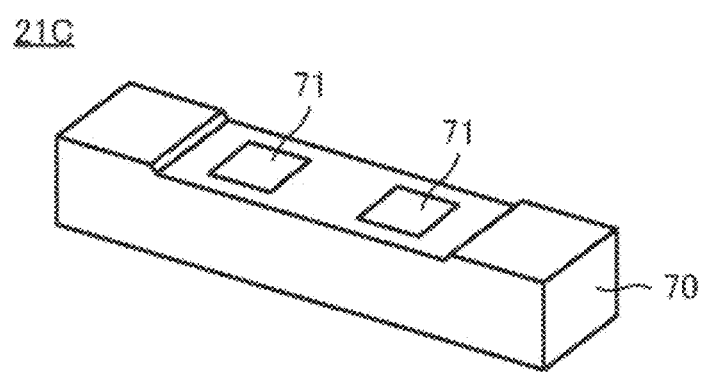
FIG. 23 is a diagram showing a pressure sensor 21C according to a third variation of the pressure sensor 21.

FIG. 23 is a diagram showing a pressure sensor 21C according to a third variation of the pressure sensor 21. The figure is a perspective view of the pressure sensor 21C. The pressure sensor 21C includes a strain generating body 70 and a plurality of strain gages 71 affixed to a surface of the strain generating body 70. The strain generating body 70 is configured to be deformed according to the force $F_{trans}$ applied by the core body 10. Each strain gage 71 detects the magnitude of the deformation. The pressure sensor 21C generates the primary pen pressure value $P_1$ from the detected magnitude of the deformation.

Description will next be made of concrete examples of the functions $f_{11}$, $f_{12}$, h, and $f_2$ described in the present embodiment.

Figure 24:
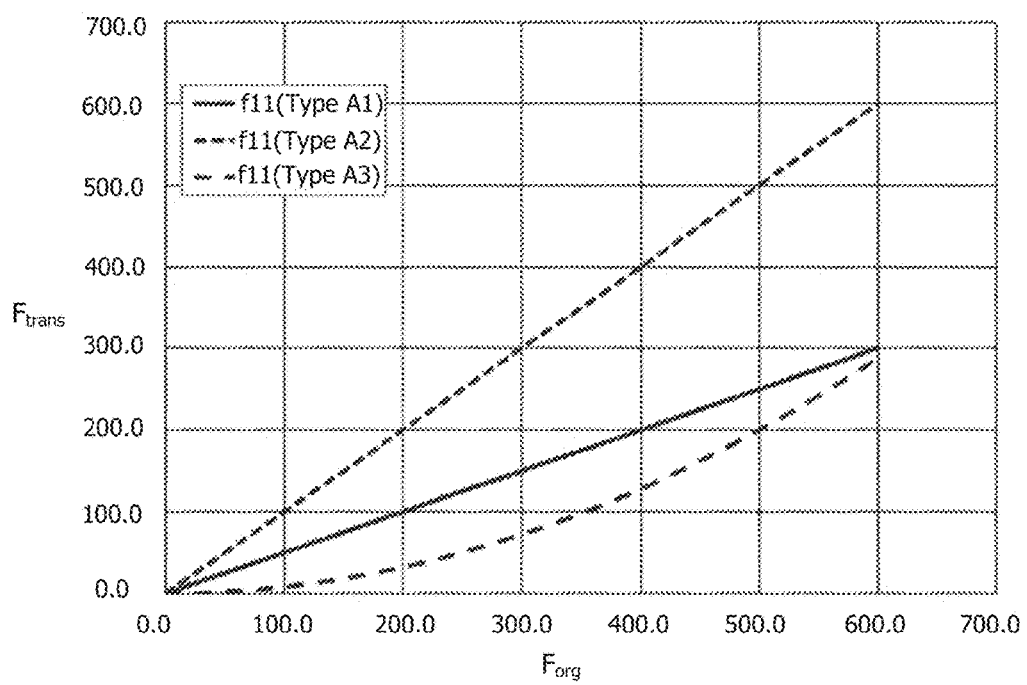
FIG. 24 is a diagram showing examples of function $f_{11}$ shown in FIG. 3.
Figure 25:
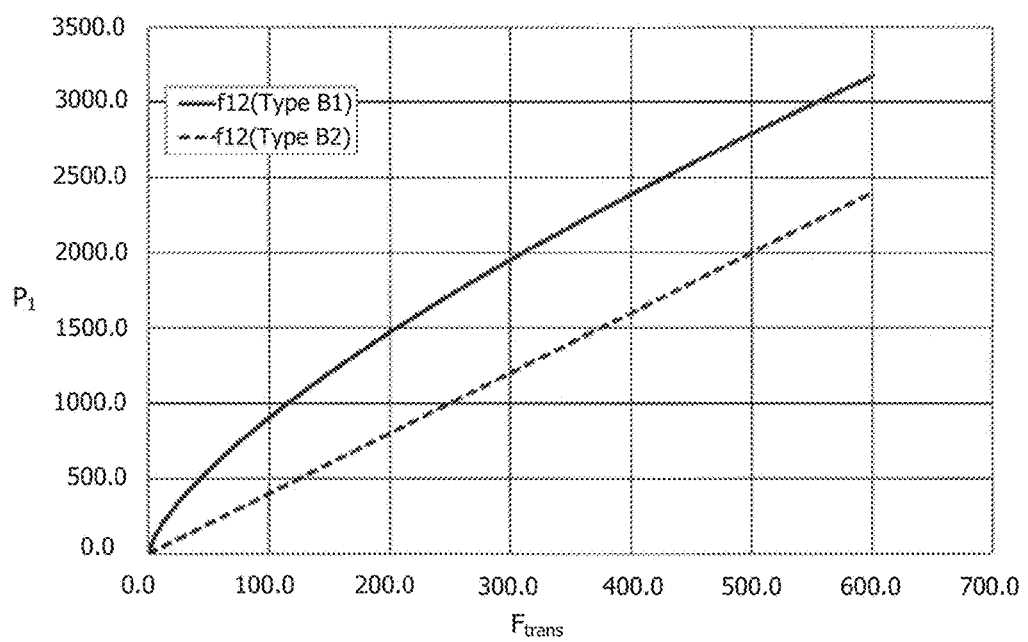
FIG. 25 is a diagram showing examples of function $f_{12}$ shown in FIG. 3.
Figure 26:
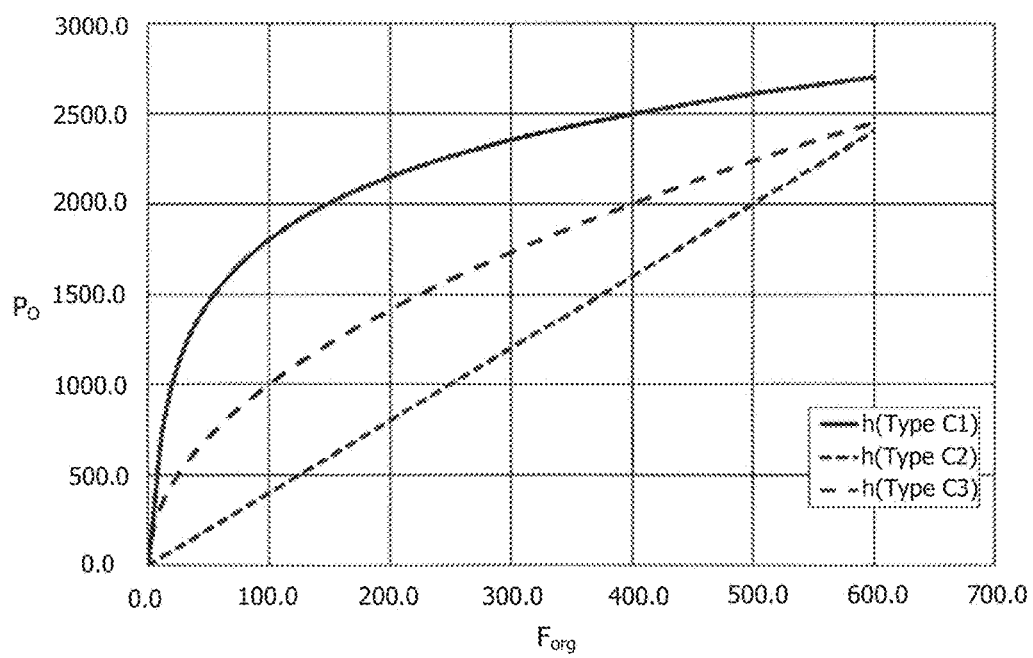
FIG. 26 is a diagram showing examples of function h representing setting information.
Figure 27:
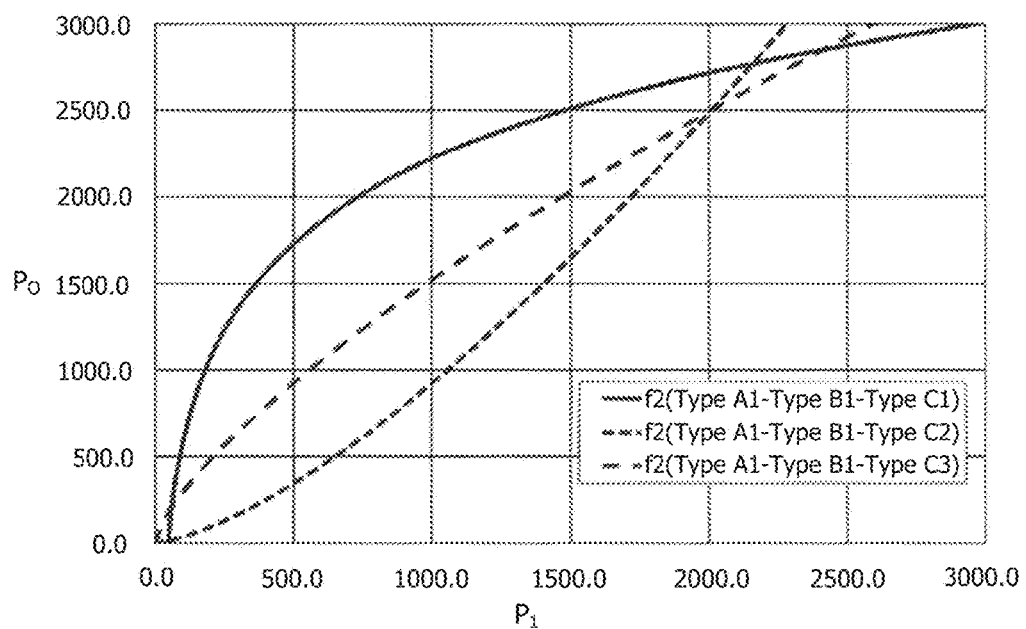
FIG. 27 is a diagram showing examples of function $f_2$ shown in FIG. 3.

FIG. 24 is a diagram showing examples of the function $f_{11}$. FIG. 25 is a diagram showing examples of the function $f_{12}$. FIG. 26 is a diagram showing examples of the function h. FIG. 27 is a diagram showing examples of the function $f_2$.

FIG. 24 shows three types, that is, types A1 to A3 as examples of the function $f_{11}$. The function $f_{11}$ of the type A1 is a linear function, and satisfies $F_{trans}=f_{11}(F_{org})=(\frac{1}{2}) \times F_{org}$. The function $f_{11}$ of the type A2 is also a linear function, and satisfies $F_{trans}=f_{11}(F_{org})=F_{org}$. The function $f_{11}$ of the type A3 is a quadratic function, and satisfies $F_{trans}=f_{11}(F_{org})=250\times(F_{org}/500)^2$.

FIG. 25 shows two types, that is, types B1 and B2 as examples of the function $f_{12}$. The function $f_{12}$ of the type B1 is a 0.7-order function, and satisfies $P_1=f_{12}(F_{trans})=36\times F_{trans}^{0.7}$. The function $f_{12}$ of the type B2 is a linear function, and satisfies $P_1=f_{11}(F_{trans})=4\times F_{trans}$.

FIG. 26 shows three types, that is, types C1 to C3 as examples of the function h. The function h of the type C1 is a logarithmic function, and satisfies $P_O=h(F_{org})=500\times\ln(F_{org})-500$. The function h of the type C2 is a linear function, and satisfies $P_O=h(F_{org})=4\times F_{org}$. The function h of the type C3 is a square root function, and satisfies $P_O=h(F_{org})=100\times F_{org}^{0.5}$.

FIG. 27 shows examples of the function $f_2$ necessary to realize the function h of FIG. 26. Describing all of combinations is complicated. Thus, FIG. 27 shows only a case where the function $f_{11}$ is the linear function of the type A1 and the function $f_{12}$ is the 0.7-order function of the type B1.

As also shown in FIG. 8, the function $f_2$ necessary to realize the function h is the composite function $f_1^{-1} \bigcirc h$ of the inverse function $f_1^{-1}$ of the characteristic $f_1$ and the correspondence relation h. When this is rewritten using the functions $f_{11}$ and $f_{12}$, $f_2=f_{12}^{-1} \bigcirc f_{11}^{-1} \bigcirc h$. Hence, the function $f_2$ in a case where the function h of the type C1 is desired to be realized under conditions that the function $f_{11}$ be the type A1 and that the function $f_{12}$ be the type B1 is $P_O=f_2(P_1)=f_{12}^{-1} \bigcirc f_{11}^{-1} \bigcirc h(P_1)=500\times\ln(2(P_1/36)^{1/0.7})-500$. Similarly, the function $f_2$ in a case where the function h of the type C2 is desired to be realized is $P_O=f_2(P_1)=2(P_1/36)^{1/0.7}$. The function $f_2$ in a case where the function h of the type C3 is desired to be realized is $P_O=f_2(P_1)=100\times(2(P_1/36)^{1/0.7})^{0.5}$. The curves shown in FIG. 27 are obtained by plotting the obtained functions $f_2$.

Concrete examples of the functions $f_{11}$, $f_{12}$, h, and $f_2$ have been described above. It is to be noted that other functions than those described above can of course be used as the functions $f_{11}$, $f_{12}$, h, and $f_2$ to be used in an actual position detecting system 1.

For example, while the functions $f_{11}$, $f_{12}$, h, and $f_2$ described above are each a function of one variable, the functions $f_{11}$, $f_{12}$, h, and $f_2$ can be each a function of multiple variables such as f(x, additionalParam), for example, where additionalParam is an additional parameter and is transmitted together with the variable x (e.g., $F_{org}$ for the function $f_{11}$, $F_{trans}$ for the function $f_{12}$, or the like) for subsequent processing. A concrete example of the additional parameter may be the moving speed of the stylus 2, which is determined from a rate of change in coordinates or the like.

FIG. 28 shows diagrams depicting effects of the position detecting system 1 according to the present embodiment. FIG. 28A represents a case where a brush type is an ink pen. FIG. 28B represents a case where the brush type is a pencil (lead pencil).

Handwritings A1a, A1b, B1a, and B1b are examples in a case where the correspondence relation h represented by the setting information supplied to the stylus 2 is an exponential function. Handwritings A2a, A2b, B2a, and B2b are examples in a case where the correspondence relation h represented by the setting information supplied to the stylus 2 is a logarithmic function. Handwritings A3a, A3b, B3a, and B3b are examples in a case where the correspondence relation h represented by the setting information supplied to the stylus 2 is a linear function. In each of the examples, the same stylus 2 was used, and the same degree of force was applied to perform input.

It is understood from the handwritings shown in FIGS. 28A and 28B that when different setting information is set in the stylus 2 as in the cases of the handwriting A1a and the handwriting A2a, for example, different handwritings are obtained even though input is performed by the stylus 2 in the same manner. It is also understood that when the same setting information is used as in the cases of the handwriting A1a and the handwriting B1a, for example, similar force response curves can be obtained even though the brush types are different.

A second embodiment of the present disclosure will next be described. The present embodiment is different from the first embodiment mainly in that a cloud server, rather than the stylus 2, is given the function of transforming the primary pen pressure value $P_1$ into the output value $P_O$. The second embodiment is otherwise similar to the first embodiment. The following description will therefore be made by directing attention to differences from the first embodiment.

Figure 29:
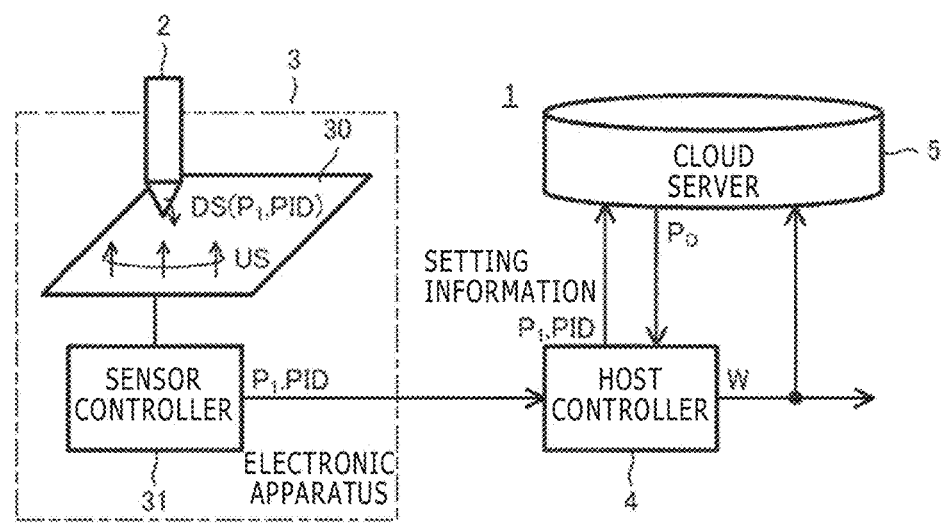
FIG. 29 is a diagram showing a system configuration of a position detecting system 1 according to a second embodiment of the present disclosure.

FIG. 29 is a diagram showing a system configuration of a position detecting system 1 according to the present embodiment. As shown in the figure, the position detecting system 1 according to the present embodiment includes a cloud server 5 in addition to the configuration of the position detecting system 1 described in the first embodiment (see FIG. 1B).

The MCU 23 (see FIG. 2) of the stylus 2 according to the present embodiment is configured to include the primary pen pressure value $P_1$ supplied from the pressure sensor 21 in the downlink signal DS and transmit the downlink signal DS without transforming the primary pen pressure value $P_1$ into the output value $P_O$. The sensor controller 31 transfers the primary pen pressure value $P_1$ received from the stylus 2 in the downlink signal DS to the host controller 4 together with the pen ID of the stylus 2, wherein the pen ID is also received in the downlink signal DS.

The host controller 4 is configured to supply the setting information representing the correspondence relation between the force $F_{org}$ and the output value $P_O$ to the cloud server 5 rather than to the sensor controller 31. The host controller 4 also performs processing of successively transferring the primary pen pressure value $P_1$ and the pen ID received from the sensor controller 31 to the cloud server 5.

The cloud server 5 is a computer connected to the host controller 4 via a network such as the Internet, an intranet, or the like. The cloud server 5 includes a central processing unit and a storage device not shown in the figure. Operation of the cloud server 5, to be described in detail below, is implemented by the central processing unit by executing a program stored in the storage device.

The cloud server 5 performs processing of transforming the primary pen pressure value $P_1$ supplied from the host controller 4 into the output value $P_O$ on the basis of the setting information and the pen ID supplied from the host controller 4. The output value $P_O$ obtained by the transformation is returned to the host controller 4, and is used by the host controller 4 to generate an ink parameter.

Concrete details of the processing performed by the cloud server 5 to transform the primary pen pressure value $P_1$ into the output value $P_O$ are similar to those in the MCU 23 of the stylus 2 in the first embodiment. Detailed description will be made in the following with reference to a flow of processing of the cloud server 5.

Figure 30:
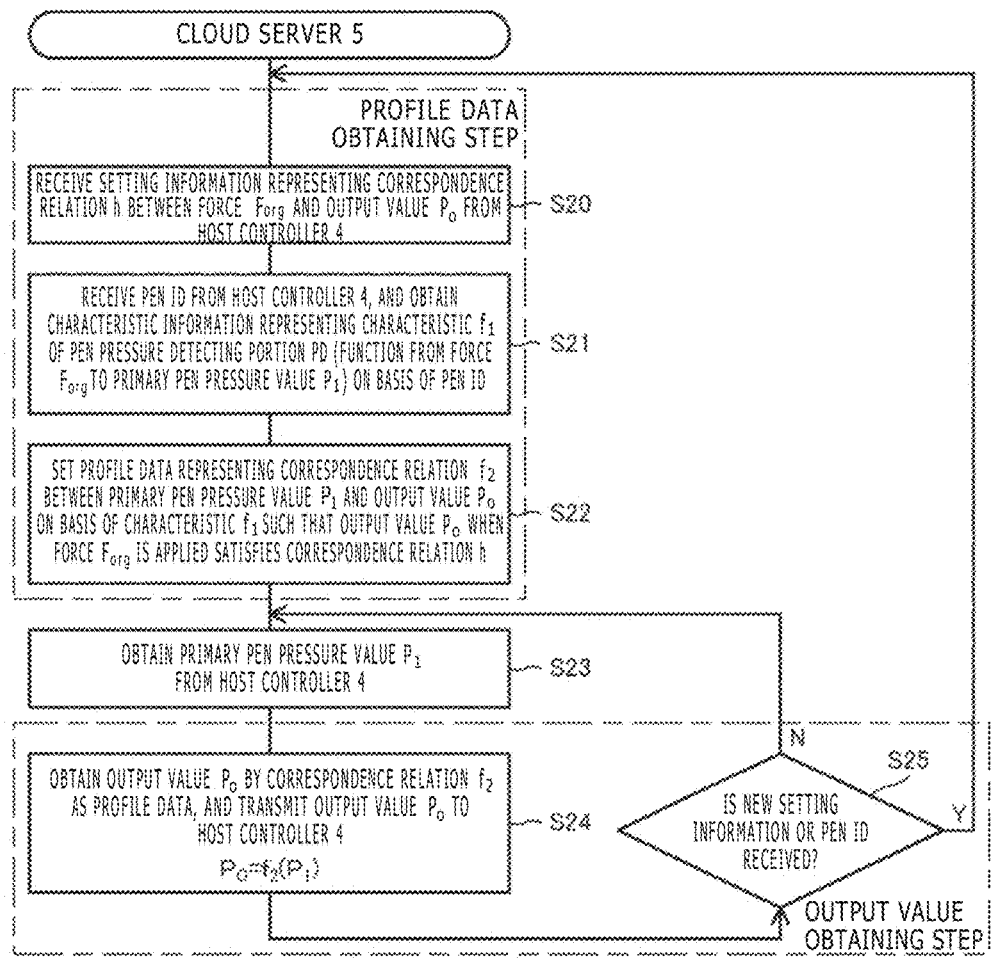
FIG. 30 is a diagram showing a flow of processing of a cloud server 5 shown in FIG. 29.

FIG. 30 is a chart showing a flow of processing of the cloud server 5. As shown in the figure, the cloud server 5 first performs a profile data obtaining step (steps S20 to S22) of obtaining profile data representing the correspondence relation between the primary pen pressure value $P_1$ and the output value $P_O$. The profile data is determined on the basis of the setting information representing the correspondence relation between the force $F_{org}$ and the output value $P_O$ and the characteristic information representing the characteristic of the pen pressure detecting portion PD.

Specifically, the cloud server 5 first receives the setting information representing the correspondence relation h between the force $F_{org}$ and the output value $P_O$ from the host controller 4 (step S20). Details of the correspondence relation h are as described in the first embodiment.

Next, the cloud server 5 receives the pen ID from the host controller 4, and obtains the characteristic information representing the characteristic $f_1$ of the pen pressure detecting portion PD on the basis of the pen ID (step S21). The pen ID is information identifying the individual stylus 2, as described above, and includes information indicating the configuration of the pen pressure detecting portion PD. Accordingly, the cloud server 5 recognizes the configuration of the pen pressure detecting portion PD from the pen ID, and obtains the characteristic information thereof accordingly. At that time, when necessary, the cloud server 5 may read the characteristic information from another server storing the correspondence relation between the pen ID and the configuration of the pen pressure detecting portion PD (or the characteristic information).

Next, on the basis of the characteristic $f_1$ represented by the characteristic information obtained in step S21, the cloud server 5 generates profile data representing the correspondence relation $f_2$ between the primary pen pressure value $P_1$ and the output value $P_O$ such that the output value $P_O$ when the force $F_{org}$ is applied satisfies the correspondence relation h represented by the setting information obtained in step S20. The cloud server 5 then stores the profile data in the storage device of the cloud server 5 itself (step S22). Details of the profile data are as described in the first embodiment. The profile data defines the composite function $f_1^{-1} \bigcirc h$. The profile data may of course be generated in the form of a look-up table illustrated in FIG. 10.

After obtaining the profile data, the cloud server 5 repeatedly performs a primary pen pressure value obtaining step of obtaining the primary pen pressure value $P_1$ from the host controller 4 (step S23). Each time the cloud server 5 performs the primary pen pressure value obtaining step, the cloud server 5 performs an output value obtaining step (steps S24 and S25) of obtaining the output value $P_O$ from the primary pen pressure value $P_1$ on the basis of the profile data stored in the storage device of the cloud server 5 itself.

Specifically, the cloud server 5 obtains the output value $P_O$ directly from the primary pen pressure value $P_1$ based on the composite function $f_2 = f_1^{-1} \bigcirc h$ stored as the profile data in the storage device (step S24). In the case where the profile data is stored in the storage device in the form of a look-up table illustrated in FIG. 10, the cloud server 5 selects one piece of profile data on the basis of the setting information and the characteristic information, and transforms the primary pen pressure value $P_1$ into the output value $P_O$ on the basis of the selected profile data.

After completing step S24, the cloud server 5 determines whether or not new setting information or a new pen ID is received from the host controller 4 (step S25). When determining that new setting information or a new pen ID is received, the cloud server 5 returns to step S20 to perform the profile data obtaining step (steps S20 to S22). Thereby, the setting information and the characteristic information are reobtained, and the profile data is reobtained. When determining that neither new setting information nor a new pen ID is received in step S25, on the other hand, the cloud server 5 returns to step S23 to repeat the obtainment of the primary pen pressure value $P_1$ and the output value $P_O$.

As described above, according to the present embodiment, the cloud server 5 rather than the stylus 2 can perform processing for isolating (decoupling) the relation between the force $F_{org}$ applied to the core body 10 and the output value $P_O$ of the stylus 2 from the specific configuration of the pen pressure detecting portion PD, that is, processing of obtaining the output value $P_O$ from the primary pen pressure value $P_1$ on the basis of the profile data representing the correspondence relation between the primary pen pressure value $P_1$ and the output value $P_O$. The stylus 2 only needs to output the primary pen pressure value $P_1$. The processing by the stylus 2 can therefore be reduced.

The present embodiment has been described supposing that the cloud server 5 obtains the output value $P_O$ directly from the primary pen pressure value $P_1$. However, as in the example described with reference to FIG. 5 and FIG. 6, the cloud server 5 may first return (reverse) the primary pen pressure value $P_1$ back to the force $F_{org}$, and then obtain the output value $P_O$ from the force $F_{org}$.

In addition, the present embodiment has been described supposing that the cloud server 5 performs the processing of obtaining the output value $P_O$ from the primary pen pressure value $P_1$. However, another computer, such for example as the sensor controller 31, the host controller 4, or the like, may perform this processing. In this case, the cloud server 5 may determine the profile data, and set the profile data in a drawing application that operates on the host controller 4. When the cloud server 5 thus determines the profile data, and sets the determined profile data in the sensor controller 31 or the host controller 4, and the sensor controller 31 or the host controller 4 obtains the output value $P_0$ from the primary pen pressure value $P_1$ on the basis of the set profile data, little network delay is expected, and the output value $P_0$ can be obtained correspondingly quickly, as compared with the configuration in which the server 5 obtains the output value $P_O$. The profile data determined by the cloud server 5 may be set in the stylus 2. In that case, as in the first embodiment, the stylus 2 obtains the output value $P_O$.

A third embodiment of the present disclosure will next be described. The present embodiment generalizes the contents described in the foregoing first and second embodiments, and includes the configurations described in the first and second embodiments.

Figure 31A:
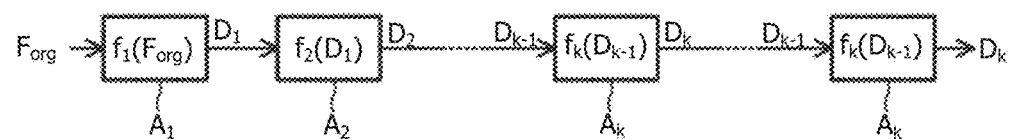
FIG. 31A is a diagram showing processing of each of processing devices $A_1$ to $A_k$ to $A_K$ according to a third embodiment of the present disclosure.
Figure 31B:
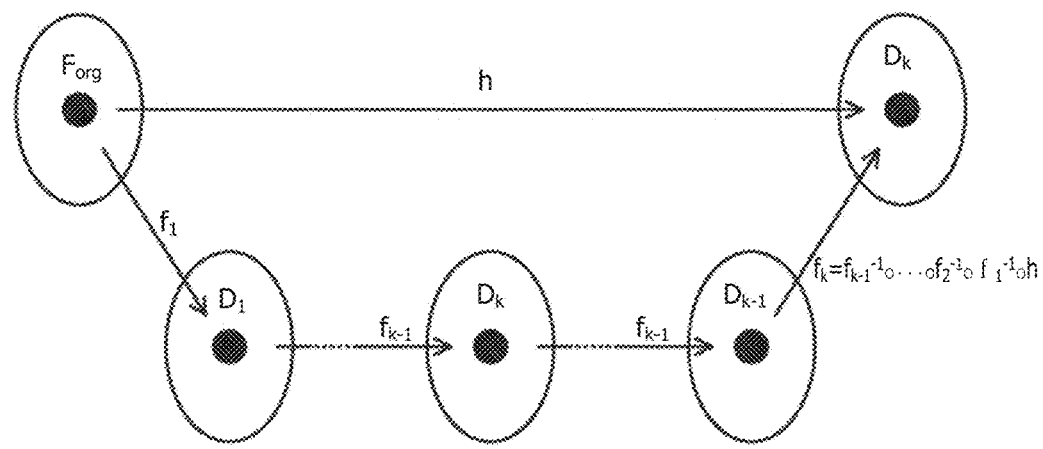
FIG. 31B is a diagram illustrating the processing of each of the processing devices $A_1$ to $A_k$ to $A_K$.

FIG. 31A is a diagram showing processing of each of processing devices $A_1$ to $A_k$ to $A_K$ (k is an integer of 1 to K, and K is an integer of 2 or more) according to the present embodiment. FIG. 31B is a diagram illustrating the processing of each of the processing devices $A_1$ to $A_k$ to $A_K$. When the present embodiment is applied to the first embodiment, for example, K is 2, the processing device $A_1$ corresponds to the pen pressure detecting portion PD, and the processing device $A_2$ corresponds to the MCU 23. When the present embodiment is applied to the second embodiment, K is 5, the processing device $A_1$ corresponds to the pen pressure detecting portion PD, the processing device $A_2$ corresponds to the MCU 23, the processing device $A_3$ corresponds to the sensor controller 31, the processing device $A_4$ corresponds to the host controller 4, and the processing device $A_5$ corresponds to the cloud server 5. The present embodiment will be described in detail in the following.

The processing device $A_1$ (first processing device) is a device, which transforms the force $F_{org}$ applied to the core body 10 of the stylus 2 into an output value $D_1$ (first output value), and which outputs the output value $D_1$. The output value $D_1$ corresponds to the primary pen pressure value $P_1$ output from the pen pressure detecting portion PD in the first and second embodiments.

The processing device $A_k$ (kth processing device) is a device, which transforms an output value $D_{k-1}$ ((k−1)th output value) output from the processing device $A_{k-1}$ ((k−1)th processing device) into an output value $D_k$ (kth output value), and which outputs the output value $D_k$. As used herein, "transformation" includes a case of setting an input value as an output value as it is. For example, in the second embodiment, the sensor controller 31 as the processing device $A_3$ transfers the primary pen pressure value $P_1$, which is output from the MCU 23 as the processing device $A_2$, to the host controller 4 as the processing device $A_4$ as it is.

The transformation processing performed by each processing device $A_k$ is expressed by a characteristic $f_k$, as shown in FIG. 31A. That is, the processing device $A_k$ is configured to perform processing expressed by $D_k=f_k(D_{k-1})$.

The processing device $A_K$ at a last stage performs processing of transforming an output value $D_{K-1}$ supplied from the processing device $A_{K-1}$ into an output value $D_K$ on the basis of setting information representing correspondence relation between a force and the output value $D_K$ and characteristic information representing the characteristics of the processing devices $A_1$ to $A_{K-1}$. This processing will be described in detail in the following with reference to a flow of processing of the processing device $A_K$.

Figure 32:
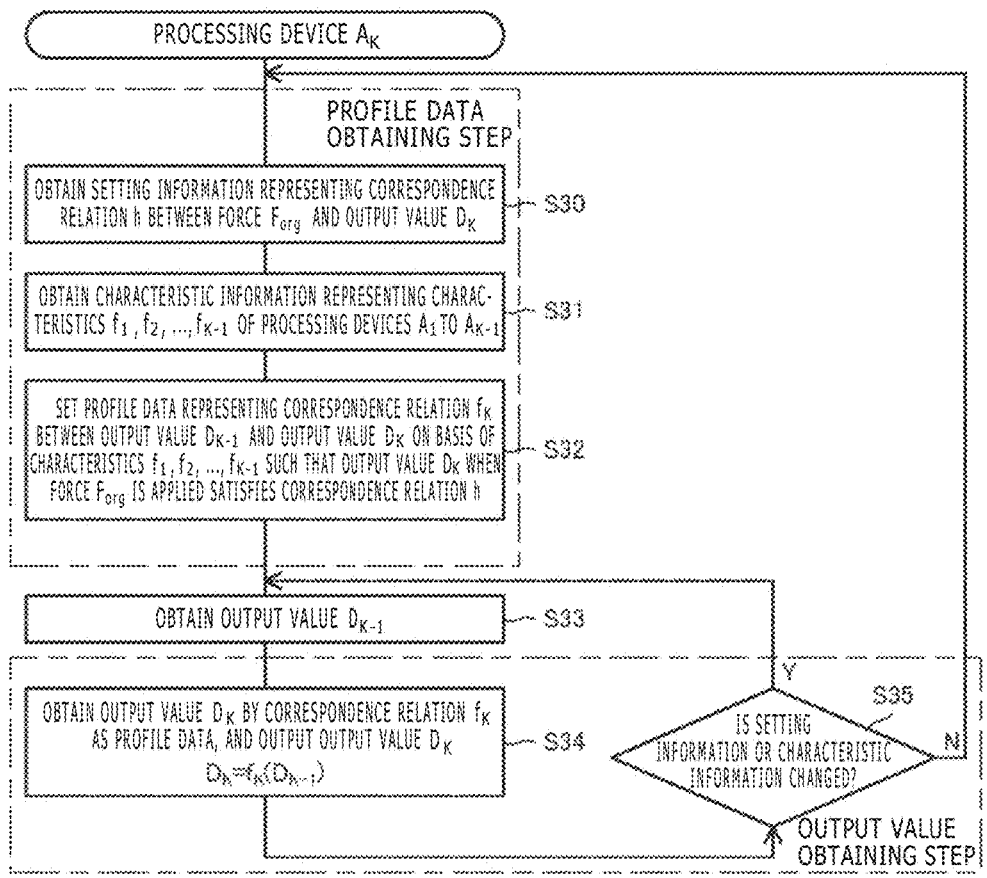
FIG. 32 is a diagram showing a flow of processing of the processing device $A_K$ shown in FIG. 31.

FIG. 32 is a diagram showing a flow of processing of the processing device $A_K$. As shown in the figure, the processing device $A_K$ first performs a profile data obtaining step (steps S30 to S32) of obtaining profile data representing correspondence relation between the output value $D_{K-1}$ and the output value $D_K$. The profile data is determined on the basis of the setting information representing the correspondence relation between the force $F_{org}$ and the output value $D_K$ and the characteristic information representing the characteristics of the processing devices $A_1$ to $A_{K-1}$.

Specifically, the processing device $A_K$ first obtains the setting information representing the correspondence relation h between the force $F_{org}$ and the output value $D_K$ (step S30), and obtains the characteristic information representing the characteristics $f_1, f_2, \ldots, f_{K-1}$ of the processing devices $A_1$ to $A_{K-1}$ (step S31). Then, on the basis of the characteristics $f_1, f_2, \ldots, f_{K-1}$ represented by the obtained characteristic information, the processing device $A_K$ generates profile data representing the correspondence relation $f_K$ between the output value $D_{K-1}$ and the output value $D_K$ such that the output value $D_K$ when the force $F_{org}$ is applied satisfies the correspondence relation h. The processing device $A_K$ stores the profile data in a storage device of the processing device $A_K$ itself (not shown) (step S32). As shown in FIG. 31B, the correspondence relation $f_K$ is a composite function $f_{K-1}^{-1} \bigcirc \ldots \bigcirc f_2^{-1} \bigcirc f_1^{-1} \bigcirc h$ of inverse functions of the respective functions $f_1, f_2, \ldots, f_{K-1}$ and the function h.

After obtaining the profile data, the processing device $A_K$ repeatedly performs a (K−1)th output value obtaining step of obtaining the output value $D_{K-1}$ from the processing device $A_{K-1}$ (step S33). Each time the processing device $A_K$ performs the (K−1)th output value obtaining step, the processing device $A_K$ performs an output value obtaining step (steps S34 and S35) of obtaining the output value $D_K$ from the output value $D_{K-1}$ on the basis of the profile data stored in the storage device of the processing device $A_K$ itself.

Specifically, the processing device $A_K$ obtains the output value $D_K$ directly from the output value $D_{K-1}$ using the composite function $f_K=f_{K-1}^{-1} \bigcirc \ldots \bigcirc f_2^{-1} \bigcirc f_1^{-1} \bigcirc h$ stored as the profile data in the storage device (step S34). Thereafter, the processing device $A_K$ determines whether or not the setting information or the characteristic information is changed (step S35). When determining that there is a change, the processing device $A_K$ returns to step S30 to perform the profile data obtaining step (steps S30 to S32). Thereby, the setting information and the characteristic information are reobtained, and the profile data is reobtained. When determining that there is no change in step S35, on the other hand, the processing device $A_K$ returns to step S33 to repeat the obtainment of the output value $D_{K-1}$ and the output value $D_K$.

As described above, according to the present embodiment, the output value $D_K$ is obtained from the output value $D_{K-1}$ on the basis of the profile data representing the correspondence relation between the output value $D_{K-1}$ and the output value $D_K$, wherein the profile data is determined on the basis of the setting information and the characteristic information. Thus, the relation between the force $F_{org}$ applied to the core body 10 and the output value $D_K$ of the processing device $A_K$ can be isolated (decoupled) from the specific configurations of the processing devices $A_1$ to $A_{K-1}$.

It is to be noted that there is no particular limitation on the selection of a computer having the role of the processing device $A_K$. For example, any of the MCU 23 shown in FIG. 2 and the sensor controller 31, the host controller 4, and the cloud server 5 shown in FIG. 29 can play the role of the processing device $A_K$. In addition, for example, when the host controller 4 adds the primary pen pressure value $P_1$ in ink data including the ink parameter, all computers receiving the ink data can play the role of the processing device $A_K$. Hence, according to the present embodiment, an arbitrary computer can isolate (decouple) a relation between the force $F_{org}$ applied to the core body 10 and a final output value (the pen pressure value used for the generation of the ink parameter or the ink parameter itself) from the specific configuration of each processing device used to transmit the force $F_{org}$ or a value based on the force $F_{org}$.

The present embodiment has been described supposing that the processing device $A_K$ obtains the output value $D_K$ directly from the output value $D_{K-1}$. However, as in the example described with reference to FIG. 5 and FIG. 6, the processing device $A_K$ may first return (reverse) the output value $D_{K-1}$ back to the force $F_{org}$, and then obtain the output value $D_K$ from the force $F_{org}$.

Preferred embodiments of the present disclosure have been described above. However, the present disclosure is not at all limited to such embodiments. The present disclosure can of course be carried out in various modes without departing from the spirit of the present disclosure.

For example, in the foregoing first embodiment, description has been made based on an assumption that the profile data obtaining step is performed by the MCU 23 (see FIG. 2) at a time in which the stylus 2 is used. However, as in storing the profile data into the above-described profile data storage unit 42 (see FIG. 9), the profile data obtaining step may be performed within a factory in a manufacturing stage. In addition, the profile data storage unit 42 may be provided in an external computer, and each time use of the stylus 2 is started, the MCU 23 may access the external computer and obtain the profile data.

In addition, for example, in the foregoing first embodiment, the stylus 2 transmits the downlink signal DS including the output value $P_O$ by using the electrode 11 disposed in the pen tip as an antenna. However, various kinds of communication media such as an electric field, a magnetic field, an electromagnetic field, infrared rays, ultrasonic waves, and the like can be used for the transmission of the output value $P_O$.

In addition, for example, in the foregoing first embodiment, the position detecting system 1 is considered in which communication is performed bidirectionally between the stylus 2 and the electronic apparatus 3. However, the present disclosure is also applicable to, for example, a position detecting system in which communication is performed in only one direction from the stylus 2 to the electronic apparatus 3 (i.e., a position detecting system not using the uplink signal US).

In addition, in the foregoing first embodiment, as shown in FIGS. 15 to 19, the force $F_{org}$ is defined as a force perpendicular to the panel surface 32 (that is, a reaction force applied from the panel surface 32 to the pen tip). However, in consideration of a frictional force occurring between the pen tip and the panel surface 32, the force $F_{org}$ may be defined as a force including an oblique component with respect to the panel surface 32. The magnitude of this oblique component can be changed according to a holding manner of the user (whether the stylus 2 is held perpendicularly or held obliquely). Thus, the magnitude of the oblique component may be made different according to each user (or each pen ID).

DESCRIPTION OF REFERENCE SYMBOLS $A_1$ to $A_k$ to $A_K$ Processing device
D1, D0 Terminal
$D_1$ to $D_k$ to $D_K$ Output value
DS Downlink signal
$F_{org}$ Force applied from panel surface 32 to core body 10
$F_{trans}$ Force applied from core body 10 to pressure sensor 21
H1 to H3 Recessed portion
L1 to L3 Wiring
$P_1$ Primary pen pressure value
PD Pen pressure detecting portion
$P_O$ Output value
US Uplink signal
1 Position detecting system
2 Stylus
3 Electronic apparatus
4 Host controller
5 Cloud server
10, 10A to 10C Core body
10a Recessed portion of core body 10
11 Electrode
12, 24 Terminal
13 to 15 Adjusting portion
20 Core body holder
20a Hollow portion of core body holder 20
20b Projecting portion of core body holder 20
21, 21A to 21C Pressure sensor
23 MCU
23a Memory
24, 24a to 24c Terminal
30 Sensor electrode
31 Sensor controller
32 Panel surface
40 Profile data specifying unit
41 Output data obtaining unit
42 Profile data storage unit
51 Housing
52 Dielectric
52a First face portion
52b Second face portion
53 Terminal member
54 Retaining member
56 Conductive member
56a Curved surface portion
57 Elastic member
58 First electrode portion
60 Pressure sensing chip
65 Package
66 Elastic member
67 Communicating hole
70 Strain generating body
71 Strain gage The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A stylus for outputting an output value corresponding to a force applied to a core body of the stylus, the stylus comprising:
   the core body;
   a pen pressure detecting portion configured to detect a primary pen pressure value corresponding to the force applied to the core body; and a processor configured to perform:
  a profile data setting step, including:
    obtaining characteristic information, which represents a characteristic of the pen pressure detecting portion, by detecting a type of the pen pressure detecting portion,
    obtaining, from an outside of the stylus, setting information, which represents a correspondence relation between the force and the output value, and
    setting profile data representing a correspondence relation between the primary pen pressure value and the output value, the profile data defining a correspondence relation between the force and the output value and determined on the basis of the characteristic information and the setting information,
  a primary pen pressure value obtaining step of repeatedly obtaining the primary pen pressure value corresponding to the force from the pen pressure detecting portion,
  an output step of obtaining the output value from the primary pen pressure value on the basis of the profile data and outputting the output value, each time the primary pen pressure value is obtained from the pen pressure detecting portion, and
  a replacement detecting step of detecting that the pen pressure detecting portion is replaced, wherein, when the replacement detecting step detects replacement of the pen pressure detecting portion, the profile data setting step reobtains the characteristic information and resets the profile data.

2. The stylus according to claim 1, further comprising:
a memory configured to store the profile data, wherein
the output step obtains the output value from the primary pen pressure value on the basis of the profile data stored in the memory.

3. The stylus according to claim 2, wherein
the memory is a nonvolatile memory.

4. The stylus according to claim 2, wherein
the memory stores a plurality of pieces of profile data, and
the profile data setting step sets the profile data by selecting one piece of profile data from the plurality of pieces of profile data stored in the memory.

5. The stylus according to claim 4, wherein
the plurality of pieces of profile data stored in the memory are stored in a form of look-up tables.

6. The stylus according to claim 1 used in conjunction with a computer, wherein
the computer supplies the setting information to the stylus, and generates ink data on the basis of the output value output by the stylus.

7. The stylus according to claim 6, wherein
the output value is an ink parameter indicating a line width or opacity of a line drawn by the computer on the basis of a series of coordinate data representing a trajectory of a position of the stylus.

8. The stylus according to claim 1, wherein
the profile data includes a first function indicative of the correspondence relation between the force and the output value and an inverse function of a second function indicative of the characteristic of the pen pressure detecting portion, and
the output step obtains the force from the obtained primary pen pressure value on the basis of the inverse function of the second function, and further obtains the output value from the obtained force on the basis of the first function.

9. The stylus according to claim 1, wherein
the profile data is formed of a composite function of a first function, which is indicative of the correspondence relation between the force and the output value, and an inverse function of a second function, which is indicative of the characteristic of the pen pressure detecting portion.

10. The stylus according to claim 1, wherein
the pen pressure detecting portion includes a pressure sensor formed of a capacitance switch or a strain gage.

11. The stylus according to claim 1, wherein
the output value is a secondary pen pressure value obtained by correcting the primary pen pressure value.

12. A processing device, which is a Kth processing device among a first to the Kth processing devices including the first processing device, which is configured to transform a force applied to a core body of a stylus into a first output value and to output the first output value, and a kth processing device (k is an integer of 2 to K, and K is an integer of 2 or more), which is configured to transform a (k−1)th output value output from a (k−1)th processing device into a kth output value and to output the kth output value, the processing device performing:
  a profile data setting step of setting profile data representing a correspondence relation between a (K−1)th output value and a Kth output value, the profile data defining a correspondence relation between the force and the Kth output value and determined on the basis of characteristics of the first to (K−1)th processing devices;
  a (K−1)th output value obtaining step of repeatedly obtaining the (K−1)th output value from the (K−1)th processing device; and
  an output step of obtaining the Kth output value from the (K−1)th output value on the basis of the profile data and outputting the Kth output value, each time the (K−1)th output value is obtained from the (K−1)th processing device.

13. The processing device according to claim 12, wherein
the first processing device includes a pressure sensor and a force transmitting mechanism configured to transmit the force to the pressure sensor, and
the characteristics of the first to (K−1)th processing devices are identified by at least one of a type of the pressure sensor and a type of the force transmitting mechanism.

* * * * *